United States Patent
Sarkinen et al.

(10) Patent No.: US 10,482,295 B2
(45) Date of Patent: Nov. 19, 2019

(54) CARD COUNTING SYSTEMS AND METHODS FOR SAME

(71) Applicant: Entrust Datacard Corporation, Shakopee, MN (US)

(72) Inventors: Daniel Sarkinen, Greenfield, MN (US); Tyler Nehowig, Dayton, MN (US); Ryan Boudreau, Minneapolis, MN (US); Ethan Yanna, Minneapolis, MN (US); Jasper Chavis, Cannon Falls, MN (US)

(73) Assignee: Entrust Datacard Corporation, Shakopee, MN (US)

( * ) Notice: Subject to any disclaimer, the term of this patent is extended or adjusted under 35 U.S.C. 154(b) by 0 days.

(21) Appl. No.: 15/621,812

(22) Filed: Jun. 13, 2017

(65) Prior Publication Data

US 2017/0357836 A1    Dec. 14, 2017

Related U.S. Application Data

(60) Provisional application No. 62/349,522, filed on Jun. 13, 2016.

(51) Int. Cl.
| | |
|---|---|
| *G06K 7/10* | (2006.01) |
| *G06T 7/13* | (2017.01) |
| *G06K 13/08* | (2006.01) |
| *G06K 13/10* | (2006.01) |
| *G06K 13/12* | (2006.01) |
| *G06K 13/14* | (2006.01) |

(52) U.S. Cl.
CPC ......... *G06K 7/10584* (2013.01); *G06K 13/08* (2013.01); *G06K 13/10* (2013.01); *G06K 13/12* (2013.01); *G06K 13/14* (2013.01); *G06T 7/13* (2017.01); *G06T 2207/30242* (2013.01)

(58) Field of Classification Search
CPC . G06K 7/00; G06K 7/10; A61B 5/684; A61H 2201/5092
USPC ........................................ 235/454, 385, 439
See application file for complete search history.

(56) References Cited

U.S. PATENT DOCUMENTS

| | | |
|---|---|---|
| 5,040,196 A | 8/1991 | Woodward |
| 7,045,765 B2 | 5/2006 | Auboussier et al. |
| 8,702,328 B2 | 4/2014 | Cronin |

(Continued)

FOREIGN PATENT DOCUMENTS

| | | |
|---|---|---|
| JP | 09223217 A | 8/1997 |
| WO | WO-2017218574 A1 | 12/2017 |

OTHER PUBLICATIONS

"International Application Serial No. PCT/US2017/037309, International Search Report dated Sep. 7, 2017", 2 pgs.

(Continued)

*Primary Examiner* — Daniel St Cyr
(74) *Attorney, Agent, or Firm* — Schwegman Lundberg & Woessner, P.A.

(57) ABSTRACT

A sensor system for counting cards includes an optical sensor assembly configured to detect edges of cards in a card stack. The optical sensor assembly includes at least an optical sensor, and a light element coupled with the optical sensor. The light element is configured to reflect light from a card stack toward the optical sensor. A remote light element is spaced from the optical sensor assembly. The remote light element is configured to direct light toward the card stack.

25 Claims, 10 Drawing Sheets

(56) References Cited

U.S. PATENT DOCUMENTS

| | | |
|---|---|---|
| 9,195,923 B2 | 11/2015 | Bungert et al. |
| 2003/0037007 A1 | 2/2003 | Beckstrom et al. |
| 2003/0155370 A1* | 8/2003 | Martin .................... B65H 1/06 |
| | | 221/123 |
| 2004/0178328 A1 | 9/2004 | Graber et al. |
| 2004/0178373 A1 | 9/2004 | Graber et al. |
| 2006/0081509 A1* | 4/2006 | Otsuka ............... G07D 11/0018 |
| | | 209/534 |
| 2010/0226576 A1 | 9/2010 | Harba et al. |
| 2011/0042403 A1 | 2/2011 | Martin |
| 2012/0041708 A1 | 2/2012 | Rutti |
| 2014/0345787 A1 | 11/2014 | Zaborowski et al. |
| 2017/0008717 A1* | 1/2017 | Oguchi .................... B65H 7/20 |
| 2017/0038935 A1* | 2/2017 | Matsushima ..... G06F 17/30994 |

OTHER PUBLICATIONS

"International Application Serial No. PCT/US2017/037309, Written Opinion dated Sep. 7, 2017", 10 pgs.

"International Application Serial No. PCT US2017 037309, International Preliminary Report on Patentablity dated Dec. 27, 2018", 12 pgs.

* cited by examiner

CARD COUNTING SYSTEMS AND METHODS FOR SAME

PRIORITY

This application claims the benefit of priority to U.S. Provisional Patent Application Ser. No. 62/349,522, filed on Jun. 13, 2016, the benefit of priority of each of which is claimed hereby, and each of which is incorporated by reference herein in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Entrust Datacard, Shakopee, Minn. All Rights Reserved.

TECHNICAL FIELD

This document pertains generally, but not by way of limitation, to detection and counting of cards such as credit cards, debit cards, identification cards or the like as part of processing of the cards.

BACKGROUND

Payment cards are processed in systems including one or more processing mechanisms that print, emboss or write to magnetic strips or chips. The payment cards are fed to the systems as card blanks stored in stacks and fed from the stacks into the processing mechanisms. The card blanks are added as needed to the system by an operator or a set number of card blanks are provided to the system before operation.

OVERVIEW

The present inventors have recognized, among other things, that a problem to be solved can include counting card blanks that are translucent, at least when viewed from the edges (e.g., transparent, translucent, clear or the like). Light reflected off the card stack is scattered (light scattering noise) by the translucent card blanks when using an optical sensor paired with a light element of an optical sensor assembly. The light scattering noise obscures light and dark features used for counting card blanks. Accordingly, the counting of card blanks based on the detection of light and dark portions for the observed light is frustrated and the card stack is not accurately counted.

The present subject matter can help provide a solution to this problem, such as providing a sensor system for counting translucent and solid card blanks. The sensor system includes an optical sensor assembly having an optical sensor and a light element coupled with the optical sensor. The light element is configured to reflect light from a card stack toward the optical sensor. The optical sensor assembly (in one example Contact Image Sensor or CIS technology) is thereby effective to count stacks of solid cards. The sensor system further includes a remote light element spaced from the optical sensor assembly. The remote light element and the optical sensor are isolated from each other to prevent reception of uninterrupted light from the remote light element by the optical sensor. Instead, the remote light element directs light into the card stack prior to the directed light reaching the optical sensor. If the card stack includes translucent cards the directed light passes through the card stack (e.g., from the edges of each of the cards) and is detected by the optical sensor. Because the light from the remote light element is not reflected the optical sensor readily observes a light line that includes discrete light and dark portions. A controller in communication with at least the optical sensor (and optionally each of the light element and the remote light element) compares the light line with a threshold. Optionally, a threshold used with translucent cards (a translucency threshold) is similar (e.g., similar or identical) to a card detection threshold used with solid cards.

The present inventors have further recognized, among other things, that another problem to be solved can include the counting of multiple stacks of card blanks, for instance card stacks stored in a plurality of hoppers. In some examples, a plurality of hoppers including various card blanks are stored in a hopper magazine and a card handling mechanism is used to selectively withdraw card blanks from one or more of the hoppers for processing by one or more processing mechanisms. For instance, differing card blanks are picked from the multiple hoppers to process a limited number of cards (one or more) on an as-needed basis (e.g., for replacement payment cards). Because the system includes multiple hoppers a single optical sensor is unable to count each of the stacks of cards stored in the respective hoppers.

The present subject matter can help provide a solution to this problem, such as providing a card storage and dispensing system configured to count card stacks in each of a plurality of hoppers. In one example, a card handling mechanism includes a withdrawal mechanism to withdraw card blanks from the hoppers. The card handling mechanism further includes an optical sensor and a light element adjacent to the optical sensor (e.g., an optical sensor assembly). The card handling mechanism including the optical sensor and the light element is coupled with an elevator, and the elevator is configured to move the card handling mechanism to interface positions with each of the hoppers including one or more of horizontal (e.g., lateral, rotational or the like) or vertical movement or the like. In the interface position for a hopper the optical sensor and the light element are in proximity to the card stack and able to illuminate, observe and count the card stack of the instant hopper. Reorientation of the card handling mechanism, for instance to a second interface position for a second hopper places the optical sensor and the light element in proximity to the card stack of the second hopper for counting of the same. Optionally, the card handling mechanism further includes the remote light element described above and herein to facilitate identification and counting of translucent cards. In another example, a plurality of sensors and associated light elements (and optionally remote light elements) are provided on a hopper magazine frame, the hoppers themselves or the like. Installation of the hoppers positions the respective card stacks in proximity to the respective sensors and light elements to facilitate counting of the card stacks in each of the installed hoppers.

In other examples, the counting of the card stacks is stored and decremented as card blanks are drawn from the respective hoppers. Decrementing is conducted based on withdrawal of card blanks or with periodic rescanning (e.g., illumination and observation) of the cards in each of the hoppers. An alert is provided, for instance by a controller in communication with a memory and the optical sensor and the light element (and optionally the remote light element) when the count for one or more of the hoppers reaches a "low" status, such as ten or fewer cards remaining. The alert allows an operator to change out or refill depleted hoppers without interrupting processing operations.

In another example, each of the hoppers includes an onboard memory. The onboard memory of a hopper includes the count for the card stack housed in the hopper. The card storage and dispensing system (by itself or as part of a processing system for cards) updates the count of cards in the hopper. In one example, the count is updated by the system with each withdrawal of a card from the hopper, for instance by the card handling mechanism. In another example, the count is updated when a decoupling operation for the respective hopper from the system is conducted. For example, when one or more of a magazine door, hopper door, lock, access code, power switch, decoupling lever or the like (generally considered decoupling operations) is operated the system writes the current card count for the hopper to the onboard memory. When the hopper is used again, for instance after reinstallation from a secure storage locker, the card storage and dispensing system counts the cards in the hopper and compares this count with the card count previously written to the onboard memory of the hopper. If the count and the previously written count differ an alert is delivered by the system to provide notification of the discrepancy (e.g., to indicate theft, tampering with hopper or memory, a counting error or the like).

This overview is intended to provide an overview of subject matter of the present patent application. It is not intended to provide an exclusive or exhaustive explanation of the disclosure. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1A:
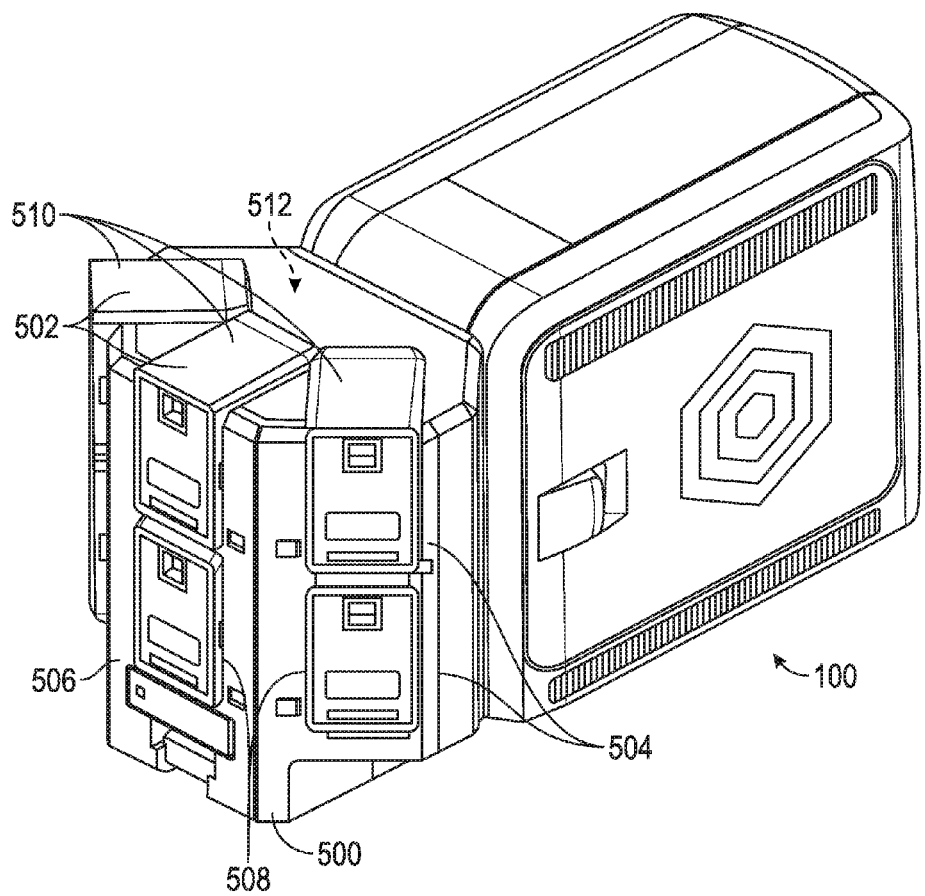
FIG. 1A is a perspective view of one example of a card processing system.
Figure 1B:
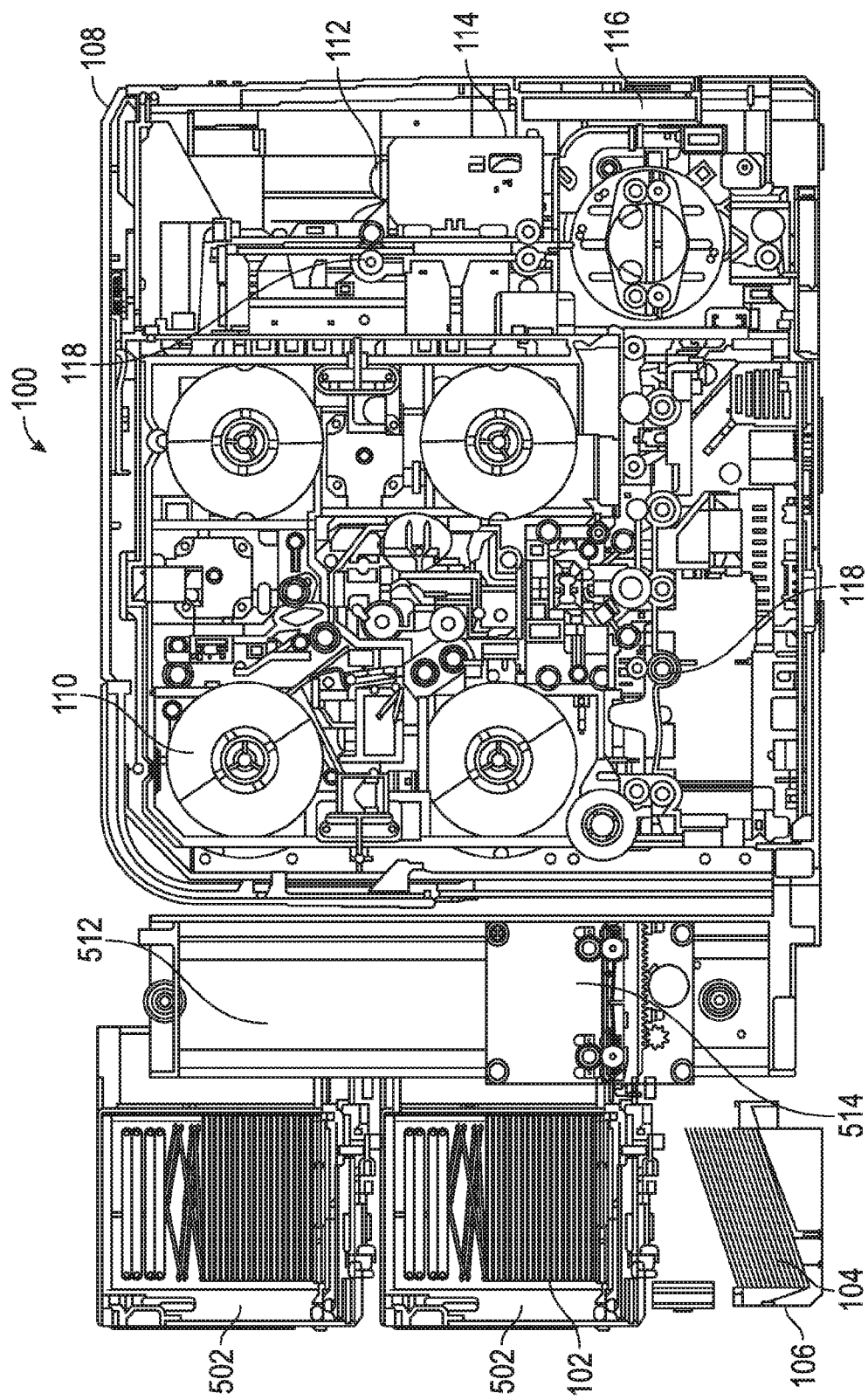
FIG. 1B is a cross sectional view of the card processing system shown in FIG. 1B.

FIGS. 1A and 1B show a perspective cross-sectional views of one example of a card processing system 100. Referring first to FIG. 1A, the example card processing system 100 includes a card storage and dispensing system 500. As will be described herein, in one example the card storage and dispensing system 500 is a stand-alone product, for instance, for use with a separate card processing system. In another example, the card storage and dispensing system 500 is included as a portion of the card processing system 100.

The card storage and dispensing system 500 includes a plurality of hoppers 502 arranged in one or more rows 504 and columns 510. The hoppers 502 are installed within respective hopper bays 508 of a hopper magazine 506. Each of the hoppers 502 is configured to hold a card stack therein for processing by the card processing system 100. A card handling mechanism 512 (as shown with a dash line in FIG. 1A and shown further in FIGS. 1B, 5A, B and 6) is provided with the card storage and dispensing system 500. The card handling mechanism 512 selects and withdraws one or more cards from the hoppers 502 and delivers the selected and withdrawn card to the remainder of the card processing system 100.

In one example, cards are identical between each of the hoppers 502. In another example, the hoppers 502 include differing card stacks. For instance, one or more of the hoppers 502 includes a card stack of translucent card blanks while one or more of the other hoppers 502 includes at least one different type of card blank (e.g., opaque, different translucence, differing colored card blanks or the like).

Referring now to FIG. 1B, a cross-sectional view of the example card processing system 100 is shown. Referring first to the card storage and dispensing system 500, two hoppers 502 are shown in a stacked configuration, for instance, in a column such as the column 510 first shown in FIG. 1A. Each of the hoppers 502 includes a stack of card blanks 102 therein. The card storage and dispensing system 500 further includes the card handling mechanism 512. The card handling mechanism 512 selects and withdraws one or more card blanks 102 from the card hoppers 502 and delivers the card blanks to the remainder of the card processing system 100 including one or more of the components shown in FIG. 1B. Further description of the card handling mechanism 512 and the card storage and dispensing system 500 is shown and provided herein (see FIGS. 5A, B and 6).

Referring again to FIG. 1B, the card processing system 100 includes in one example a system housing 108 including one or more components of the card processing system 100 used to process card blanks 102 from the hoppers 502. For instance, in the example shown in FIG. 1B, the card processing system 100 includes a print engine 110 configured to provide one or more of graphics, printed indicia, text or the like to the card blanks 102. The print engine 110 includes, but is not limited to, one or more printing mechanisms including inkjet printing, dye diffusion thermal transfer printing (D2T2), retransfer printing or the like. In another example, the card processing system 100 optionally includes one or more laser generators configured to apply images, text, graphics or the like to the card blanks 102 (e.g., used alone or in combination with other printing mechanisms).

As further shown in FIG. 1B, a card transport mechanism 118 is provided within the system housing 108. The card transport mechanism 118 including one or more driven and passive rollers, belts, gripping mechanisms or the like as well as passages through the system housing 108 configured to move the card blanks 102 between system 100 components. For instance, the card transport mechanism 118 moves cards from a withdrawal mechanism 514 of the card handling mechanism 512 between each of the components of the card processing system 100. In one example, the card transport mechanism 118 moves the card blanks 102 from the print engine 110 to one or more of a mag stripe encoder 112, a memory (e.g., chip) writer 114 or the like. Optionally, the card transport mechanism 118 includes one or more mechanisms configured to reorient a card within the system 100, such as a card rotator 116 that orients the cards in one or more of horizontal, vertical or flipped orientations for further transport and processing in the system 100.

In still other examples, the card processing system 100 includes one or more of embossing or lamination stations for further processing of the cards 102. The system includes a reject hopper in another example for reception of cards that are damaged or fail to meet quality control standards of the processing system 100.

As further shown in FIG. 1B, in one example, the card processing system 100 optionally includes an output bin 106. One or more processed cards 104 are received at the output 106 (for retrieval by an operator or delivery downstream, for instance, to the packaging system, handling system or the like) after processing by the card processing system 100. Examples of card processing systems are known, such as the SD or CD family of card processing systems available from Entrust Datacard Corporation of Shakopee, Minn. Other examples of card processing systems are disclosed in U.S. Pat. Nos. 7,434,728 and 7,398,972, each of which is incorporated herein by reference in its entirety.

Figure 2A:
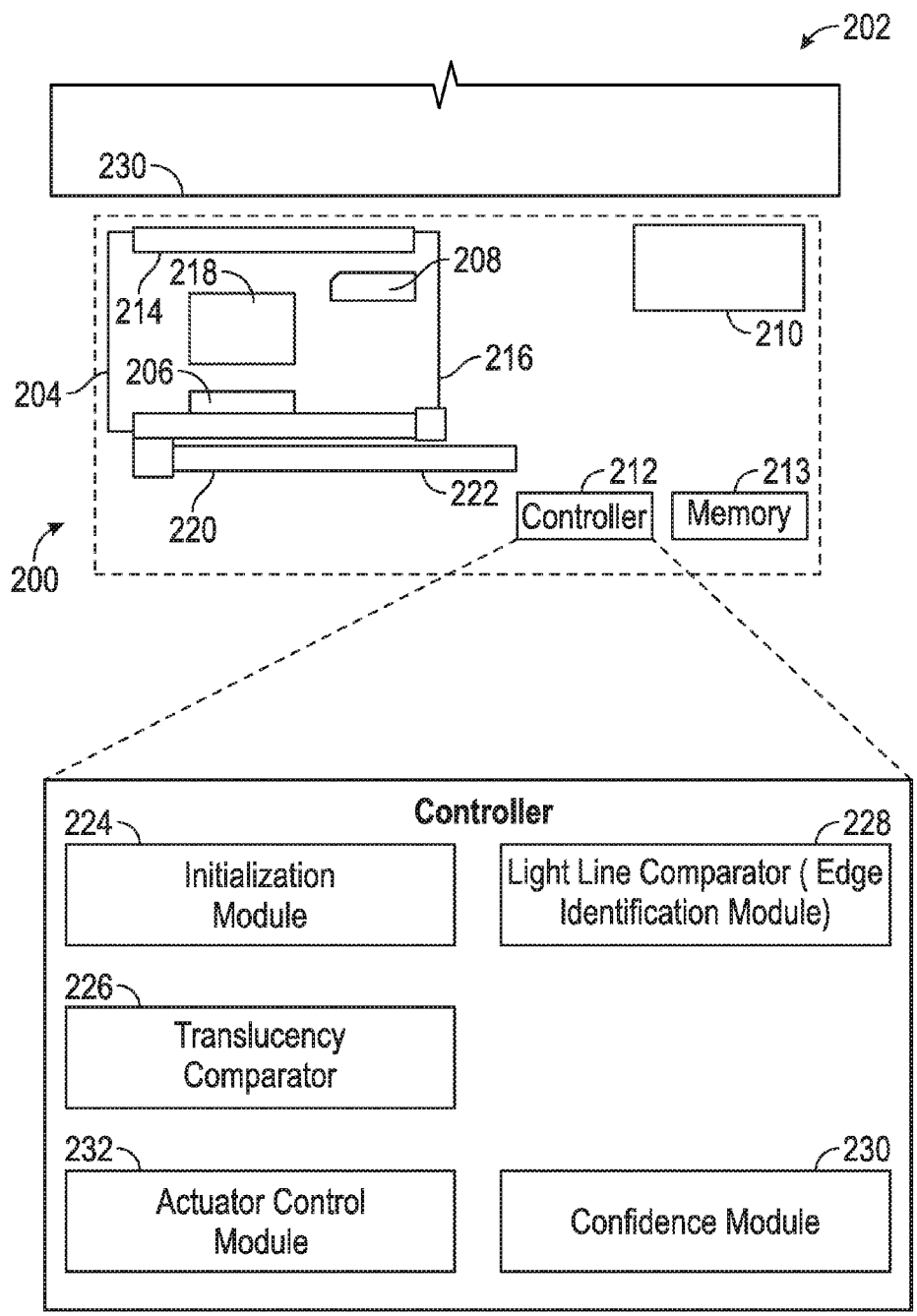
FIG. 2A is a schematic plan view of one example of a sensor system for counting cards.
Figure 5A:
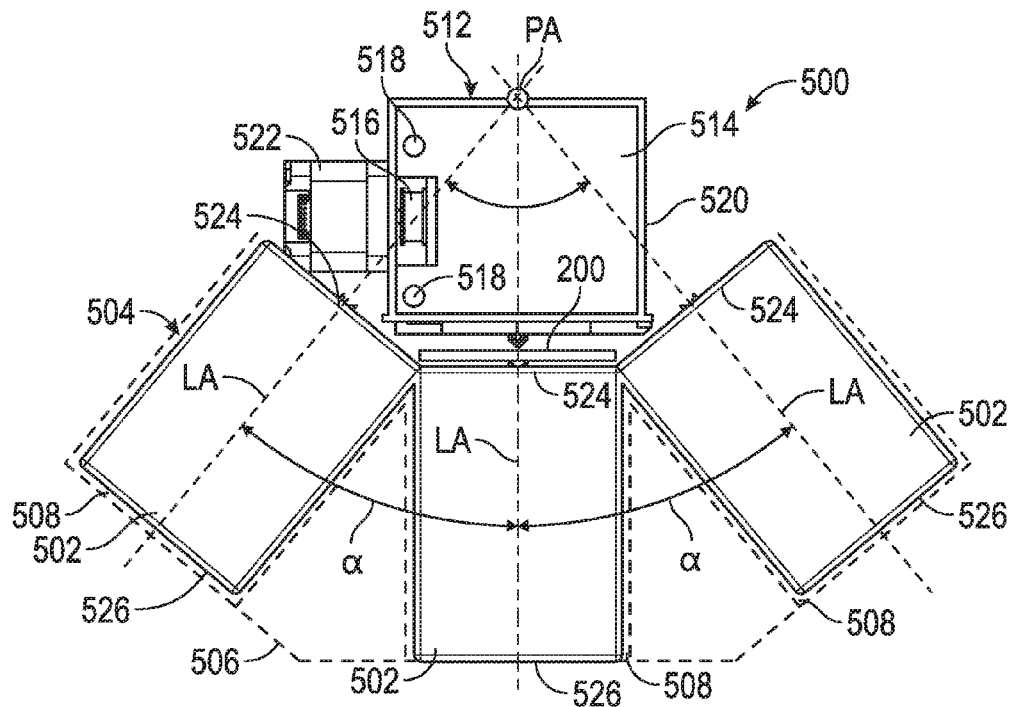
FIG. 5A is a plan first operational view of the card storage and dispensing system with a card handling mechanism in one example of an interface position.
Figure 5B:
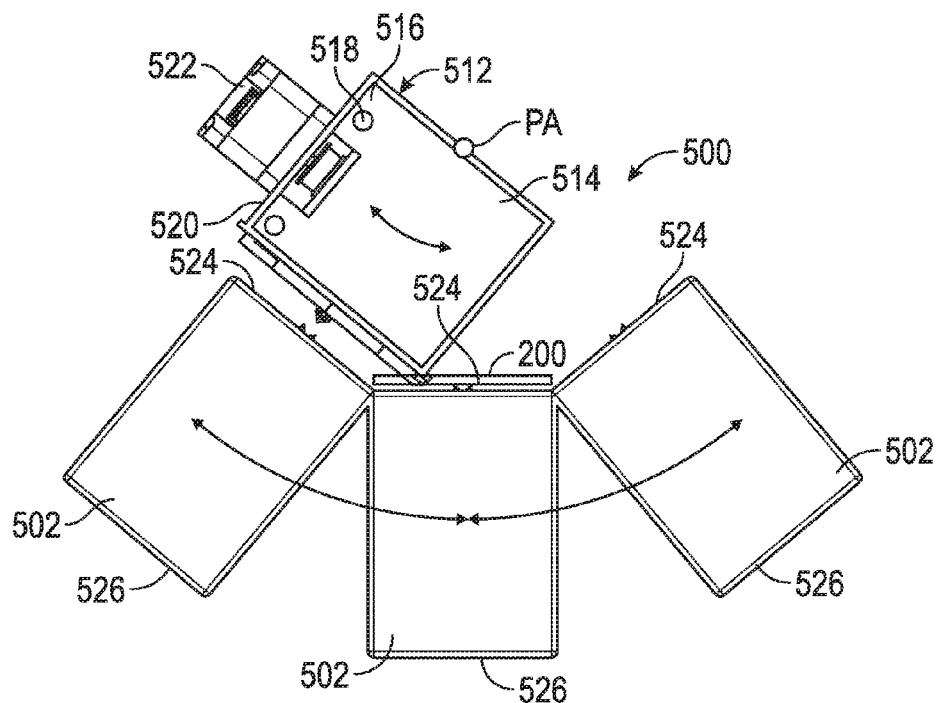
FIG. 5B is a plan second operational view of the card storage and dispensing system with a card handling mechanism in another example of an interface position.
Figure 6:
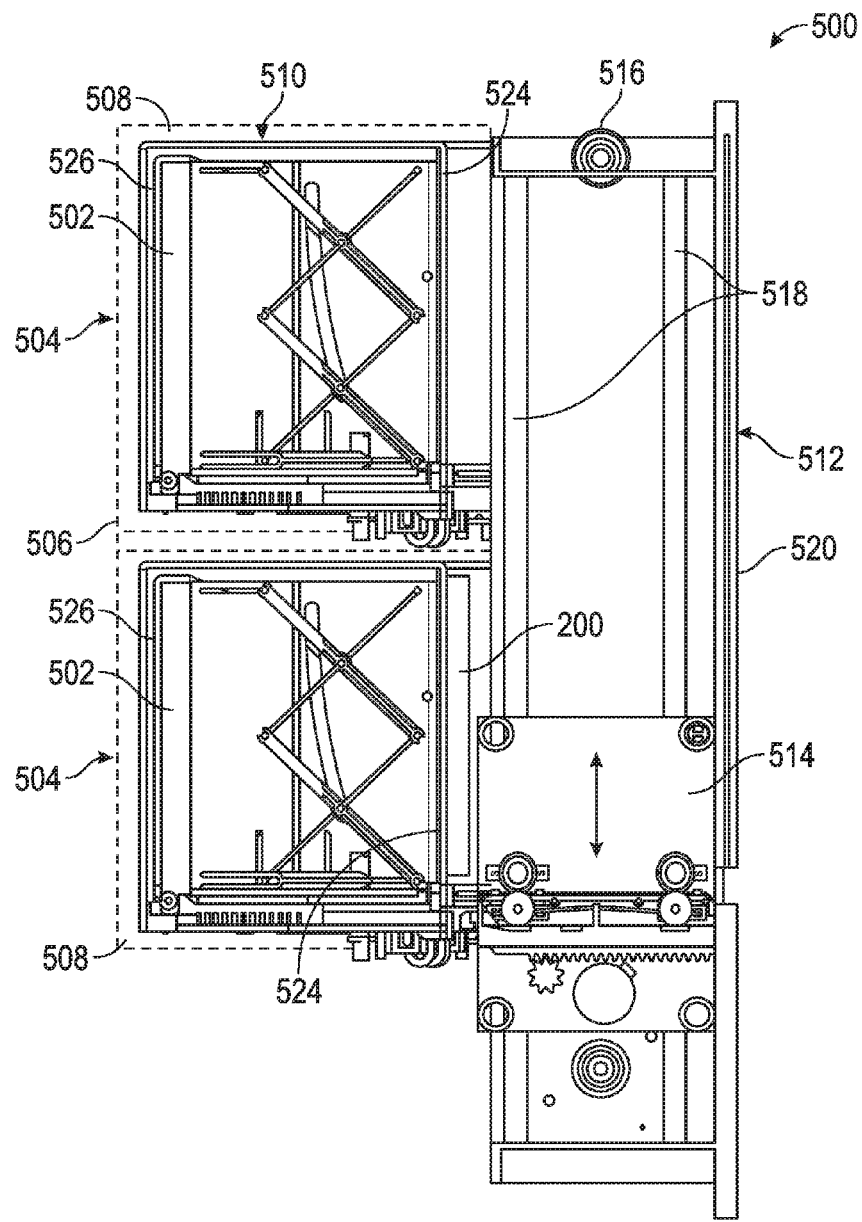
FIG. 6 is a third operational view of the card storage and dispensing system with a card handling mechanism in still another example of an interface position.

FIG. 2A shows one example of a sensor system 200 configured to count a number of cards, for instance, within a card stack 202. As previously described herein, the sensor system 200 is in one example used with a card processing system 100, for instance the card processing system 100 shown in FIG. 1. In another example, the sensor system 200 is used with a card storage and dispensing system 500. In one example, the card storage and dispensing system is shown in FIGS. 5A, 5B and 6 and further described herein. The sensor system 200 is optionally installed with one or more of the hoppers 502 of the card storage and dispensing system 500. In another example, the sensor system 200 is optionally installed with one or more of the hopper bays 508 of the hopper magazine of the dispensing system 500. In still another example, the sensor system 200 is coupled with the card handling mechanism 512 (e.g., the withdrawal mechanism 514) and selectively interfaced with one or more of the card hoppers 502 and the stacks of cards 102 therein as the withdrawal mechanism 514 moves into interface positions with the hoppers 502 (e.g., to withdraw one or more cards, conduct a count of the cards in the respective hoppers 502 or the like).

Referring first to FIG. 2A, the sensor system 200 includes an optical sensor assembly 204 provided at a location in close proximity to the card stack 202. As shown, the optical sensor assembly 204 is in contact with (e.g., including, but not limited to, actual contact with the card edges 230 or positioning of the optical sensor assembly 204 immediately adjacent to the card edges 230). As shown, the optical sensor assembly 204 includes an optical sensor assembly housing 216 including an optical sensor 206 and a light element 208. As will be described herein, the light element 208 is configured to generate light that is directed toward the card stack 202 and reflected off the card edges 230. The light is reflected off of the card edges 230 and received at the optical sensor 206. The optical sensor 206, for instance in communication with the a controller 212 (further described herein), is configured to sense the light line reflected from the card edges 230 and the controller 212 accordingly counts the number of cards within the card stack 202.

As further shown in FIG. 2A, the optical sensor assembly 204, in another example, includes a sensor lens 218 and a sensor window 214. The sensor window 214, in one example, provides a passage through the optical sensor assembly housing 216 to transmit light from the light element 208 to the card edges 230 and thereafter facilitate the transmission of a light line through the sensor lens 218 for reception by the optical sensor 206. The optional sensor lens 218 focuses the reflected light on the optical sensor 206. In one example, the sensor lens focuses the reflected light on an optical sensor having a smaller footprint (e.g., height than the card stack). Accordingly, the optical sensor 206 does not need sensing elements along the entirety of the card stack height. The optical sensor assembly 204 is, in one example, a consolidated assembly provided as part of the sensor system 200. For instance, the light element 208 and the optical sensor 206 are housed in a unitary or adjacent assembly and separated from the remote light element 210 (described herein).

In another example, the sensor system 200 includes an optional lateral actuator 220. The lateral actuator 220 optionally includes an actuator track 222 configured to move the optical sensor assembly 204 relative to the card stack 202. The lateral actuator 220 moves the light element 208 as well as the optical sensor 206 in a lateral direction along the card edges 230. As the lateral actuator 220 moves the optical sensor 206 and the light element 208, the light element 208 continues to generate light which is received by the optical sensor 206. By moving the optical sensor assembly 204 including the optical sensor 206 along the card edges 230 multiple assessments of the card stack 202 are made and accordingly the count of the card stack 202 is repeated (e.g., with one or more of a translucency or light comparator 226, 228 described herein). Optionally, the controller 212 includes a confidence module 230 including a statistical algorithm that generates a composite (final) card count based on each of the comparisons of the various light lines relative to one or more card detection thresholds (e.g., thresholds for detecting and counting opaque cards and translucent cards).

As further shown in FIG. 2A, the sensor system 200, in another example, includes a remote light element 210 spaced from the optical sensor assembly 204. As will be described herein, the remote light element 210 is isolated from the optical sensor 206. That is to say, light generated by the remote light element 210 is not received at the optical sensor 206 in an uninterrupted manner. In contrast, the light from the light element 208 is received in an uninterrupted (reflected) manner. Instead, of uninterrupted light the remote light element 210 generates light for transmission into the card stack 202. Where the card stack 202 includes translucent cards (e.g., including translucent, transparent, semi-transparent cards or the like) the remote light element 210 transmits light into the card stack 202 and the light is then subsequently received at the optical sensor 206 after having passed through the card stack 202. The remote light element 210 facilitates the counting of translucent cards in the card stack 202 while minimizing (e.g., preventing, substantially reducing or the like) light scattering noise otherwise generated with reflected light provided by the light element 208 when directed toward translucent cards.

In one example, the remote light element 210 works in cooperation with the optical sensor assembly 204 including the lateral actuator 220. In a similar manner to moving the optical sensor assembly 204 with the lateral actuator 220 when used with the light element 208 the optical sensor 206 is similarly moved by the lateral actuator 220 along the card edges 230 when the remote light element 210 is used to generate light for detection at the optical sensor 206. For instance, the optical sensor 206 when moved laterally by the lateral actuator 220 receives two or more light lines that are accordingly assessed by the controller 212, for instance, one or more of the translucency comparator 226 or the light line comparator 228 shown in FIG. 2A. In one example, the remote light element 210 is substantially static relative to the optical sensor assembly 204 while the optical sensor assembly 204 is moveable relative to the remote light element 210 with the lateral actuator 220.

As described herein, the optical sensor assembly 204 includes an optical sensor 206. In one example, the optical sensor 206 includes, but is not limited to, a contact optical sensor configured for placement immediately adjacent to the card stack 202. For instance, the placement of the optical sensor in FIGS. 2A, B is exaggerated for illustration purposes. In one example, the positioning of the optical sensor 206 such as a contact optical sensor includes positioning of the optical sensor 206 around one millimeter (1 mm) from the card edges 230 to facilitate the reception of reflected light from the card edges 230 generated by the light element 208. Additionally, the close positioning of the optical sensor 206, in one example, assists in isolating the optical sensor 206 from any light generated by the remote light element 210 that is incidentally reflected along the card edges 230. In still another example, a physical obstruction is provided between the remote light element 210 and the optical sensor 206 by one or more of the optical sensor assembly housing 216, features of the remote light element 210 (including a shroud, hood, wall or the like) or the like.

Figure 2B:
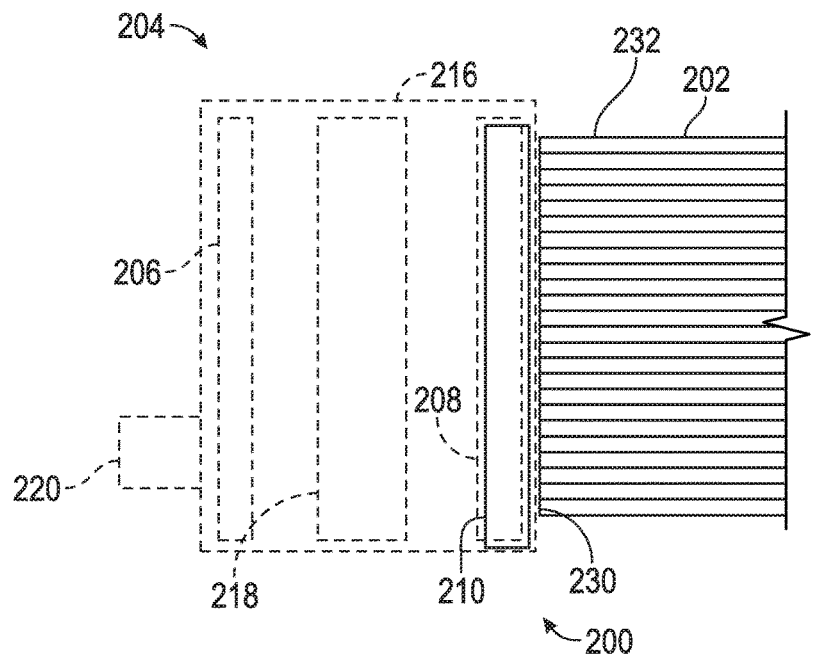
FIG. 2B is a schematic side view of the sensor system of FIG. 2A.

Referring now to FIG. 2B, another view of the sensor system 200 is provided. In the example shown in FIG. 2B, the sensor system 200 is shown from the side, for instance, with the card stack 202 having a plurality of individual cards stacked on their card faces 232. The card edges 230 are shown in close proximity to the optical sensor assembly 204 as well as the remote light element 210. In the example shown in FIG. 2B, each of the remote light element 210, the light element 208 and the optical sensor 206 are shown with an elongated configuration extending along the card edges 230 of the card stack 202. In one example, each of the remote light element 210, the light element 208 and the optical sensor 206 extend along the entire length of the card stack 202. Each of the components of the optical sensor assembly 204 are shown in the background (by dashed lines) relative to the remote light element 210 shown in the foreground (with solid lines).

In one example, where the optical sensor assembly 204 is used with a modular hopper, such as the modular hopper 502 described and shown herein, each of the optical sensor 206, the light element 208 and the remote light element 210 extend along the height of the hopper 502 designated for storage of the card stack 202. For instance, if the hopper is configured to hold 500 cards, the remote light element 210, light element 208 and the optical sensor 206 are configured to extend along at least 500 cards within a card stack 202 in the modular hopper 502. In another example, each of the sensor 206 and light elements (208, 210) include multiple sensors and light elements 208 (and remote light elements 210) in a stacked configuration that corresponds to the specified height of the card stack 202. Optionally, the optical sensor 206 is centrally located in the optical sensor assembly housing 216 (as opposed to extending the height) and the sensor lens 218 focuses the light (reflected or directed as described herein) from the card stack 202 to the optical sensor 206.

Referring again to FIG. 2B, the lateral actuator 220 is also shown coupled with the optical sensor assembly 204, for instance, the optical sensor assembly housing 216. As previously described herein, the lateral actuator 220 is in one example configured to move at least the optical sensor 206 relative to the remote light element 210. Accordingly light transmitted into a translucent card stack 202 is received at the optical sensor 206 in a variety of orientations (spacings) of the optical sensor 206 relative to the remote light element 210. The optical sensor 206 thereby receives a plurality of light lines generated by the remote light element 210. The plurality of light lines are assessed by the controller 212, for instance including one or more of a translucency comparator 226, a light line comparator 228, a confidence module 230 or the like (see FIG. 2A). Further, the controller 212, in one example, includes an actuator control module 232 configured to operate the lateral actuator 220 and thereby move the optical sensor assembly 204 (including the optical sensor 206) relative to the remote light element 210. In one example, the actuator control module 232 moves the optical sensor assembly 204 in a continuous manner while light lines are continuously generated by one or more of the light element 208, the remote light element 210 or the like. The optical sensor 206 continuously or intermittently receives the light lines delivered from the card stack 202 and the controller 212 compares the light lines with one or more thresholds to accordingly provide a count of the card stack 202. In another example, the actuator control module 232 moves the optical sensor assembly 204 in a step fashion, for instance, from a first location to a second location and at each of at least the first and second locations (or further locations) the actuator control module 232 arrests movement of the optical sensor assembly 204 to ensure a static measurement of the light line is taken at each of the respective locations.

One example of a controller 212 is shown in FIG. 2A and includes a plurality of example modules. The controller 212 is in one example a component of the sensor system 200. In another example, the controller 212 is a component of an overall system including, but not limited to, one or more of the card processing system or the card storage and dispensing system 500 (see FIGS. 1A, B).

Referring again to FIG. 2A, the controller 212 includes one or more of translucency or light line comparators 226, 228. The translucency comparator 226 assesses a light line detected with the optical sensor 206 and compares the light line with a translucency threshold (e.g., one or more numerical values corresponding to graduations between light and dark values). Based on the comparison of the light line with the translucency threshold the controller 212 including the translucency comparator 226 determines whether the card stack 202 is translucent. If the card stack is identified as translucent the controller 212 uses the light line for counting (or optionally uses one or more light lines taken at different locations) the card stack 202. If the translucency threshold is not met the controller 212 optionally transitions to using reflected light, for instance from the light element 208 of the optical sensor assembly 204. In another example, the initialization module 224 operates the sensor system including the remote light element 210, the light element 208 and the optical sensor 206 at the installation of the card stack (e.g., in the hopper 502) to identify whether the card stack 202 is translucent or opaque and then transitions the controller to use the differing light elements 208, 210 accordingly.

The controller 212, in another example, includes a light line comparator 228. The comparator 228 includes one or more card detection thresholds to discriminate between the light and dark portions of the light line detected at the optical sensor 206. For instance, the light line comparator 228 optionally includes one or more opaque card detection thresholds for use with differing colored cards. In another example, the comparator 228 includes one or more translucent card detection thresholds for use with cards having varying degrees of translucency (e.g., transparent, clouded, translucent, semi-translucent or the like). In still another example, the comparison made by the translucency comparator 206 (e.g., translucent or opaque) is used by the controller 212 to select the card detection threshold used with the light line comparator 228.

As further shown in FIG. 2A, in one example, the sensor system 200 includes a memory, such as the memory 213, in communication with one or more of the controller 212, the optical sensor 206, the light element 208 and the remote light element 210, for instance by way of a bus, system interface, direct wiring or wireless connections or the like. Optionally, the memory 213 is in communication with the controller 212 and the controller 212 is in communication with each of the other components of the sensor system 200 including the optical sensor 206, the light element 208 and the remote light element 210 (as well as the optional lateral actuator 220). As previously described, the controller 212, in one example, counts the cards of the card stack 202.

Optionally, the count of the card stack 202 is, in one example, stored in the memory 213. As will be described herein, in one example, the memory 213 is incorporated into a memory of a hopper such as the modular hopper 502 shown, for instance, in FIGS. 5A, B. In an example, the memory 213 associated with the hopper 502 is updated with each decrement of the card stack 202. For instance, as a card handling mechanism 512 withdraws cards from the card stack 202. (e.g., for processing by the card processing system 100) the memory 213 including the count generated with the sensor system 200 is decremented by one or more cards depending on the number of cards withdrawn. In another example, the sensor system 200 conducts a count of the card stack 202, for instance, the cards remaining in the card stack 202 when the modular hopper 502 is accessed, decoupled or the like from the card storage dispensing system 500 also shown in FIGS. 5A, 5B. In still another example, the sensor system 200 counts the cards of the card stack 202 whenever the card processing system 100 or the card storage and dispensing system 500 (optionally part of the card processing system 100) has its power cycled. For instance, where the card processing system 100 is shut down (at the end of a work day, for service or the like) the sensor system 200 (the controller 212) automatically counts the cards within the card stack 202. The updated count in the card stack 202 is stored in the memory 213. The updated count is stored in the memory 213 on the hopper 502 containing the counted cards of the card stack 202. When the machine is initialized, for instance, powered back on or the hopper 502 is replaced in the machine (e.g., the card processing system 100 or the card storage and dispensing system 500) the sensor system 200 automatically counts the cards in the card stack 202. The controller 212, in another example, compares the instant count of the card stack 202 with the updated count of the card stack previously stored in the memory 213. If either of the numbers differ from one another an alert is provided that the card counts do not match. In some examples, the comparison between the updated card count stored in the memory 213 and the card count taken at the initialization of one or more of the card processing system 100 or the card storage and dispensing system 500 serves as a security feature configured to detect the unauthorized removal of card blanks from the card stack 202.

Figure 3:
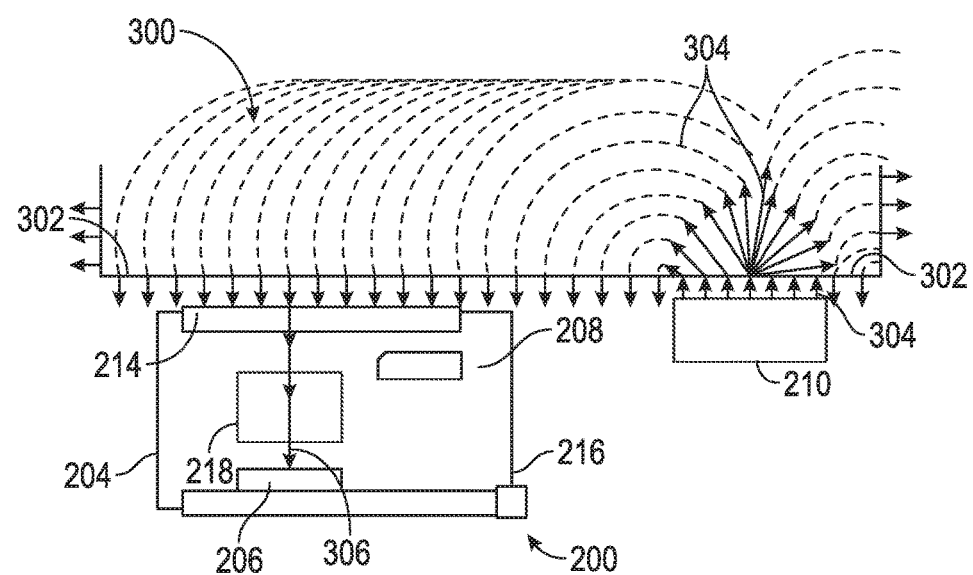
FIG. 3 is a schematic plan view of the sensor system of FIG. 2A in operation with a remote light element and a translucent card stack.

Referring now to FIG. 3, the sensor system 200 is shown in operation using the remote light element 210 and a translucent card stack 300. As shown in FIG. 3, the translucent card stack 300 includes a plurality of translucent cards to facilitate the transmission and distribution of light, for instance, from the remote light element 210 to the optical sensor 206 of the optical sensor assembly 204. As further shown in FIG. 3, the remote light element 210 is spaced relative to the optical sensor assembly 204 including the optical sensor 206. As previously described, one or more of the spacing or separation of the remote light element 210 relative to the optical sensor 216 prevents (e.g., eliminates or minimizes) the uninterrupted transmission of light from the remote light element 210 to the optical sensor 216 (for instance, by reflection). Instead, the directed light 304 from the remote light element 210 is directed into the translucent card stack 300 for eventual detection at the optical sensor 216.

In operation, the remote light element 210 is activated, for instance, with an initialization module 224 of the controller 212 shown in FIG. 2A. The remote light element 210 shines directed light 304 toward the card stack 300. As shown with the dashed lines in FIG. 3, the directed light 304 is distributed into the translucent card stack 300 and exits the translucent card stack 300 along the card edges 302. At least a portion of the directed light 304 is received at the optical sensor assembly 204 and passes through the sensor window 214 to the optical sensor 216. As shown in FIG. 3, a light line 306 representing this received light from the translucent card stack 300 is incident on the optical sensor 216. The light line 306 is assessed by the controller 212, for instance, with one or more of the translucency comparator 226 or the light line comparator 228. The assessed light line 306 is used to differentiate between light and dark zones of each of the translucent cards corresponding to the interface of the translucent cards with each other along their card faces (feature 232 shown in FIG. 2B corresponding to a dark zone). The bright and dark graduation between these features is assessed by the controller 212 for instance with the light line comparator 228 to count the number of cards in the translucent card stack 300.

In another example, the optical sensor assembly 204 and the remote light element 210 of the sensor system 200 are used in one example to identify translucent cards within the card stack (e.g., a hopper 502 of the system 500 shown in FIGS. 5A, B and described further herein). For instance, the initialization module 224 of the controller 212 operates the remote light element 210 at installation of the hopper within the system 500. The remote light element 210 shines the directed light 304 toward the translucent card stack 300, for instance, along the card edges 302. As shown in FIG. 3, if the card stack 300 includes translucent cards the directed light 304 is distributed through the translucent card stack 300 and is incident upon the optical sensor 216 as the light line 306. The controller 212 includes a translucency comparator 226 including a translucency threshold. The light line 306 is compared with the translucency threshold to determine whether the light line 306 is indicative of translucent cards in the card stack 300. For instance, where the card stack does not include translucent cards the directed light 304 is not transmitted through the card stack, the light line 306 is dark and the optical sensor 216 transmits the incident (dark) light line 306 to the controller 212 where the translucency comparator 226 determines the translucency threshold has not been met. In one example, the controller 212 then deactivates the remote light element 210 and proceeds with counting of the card stack for instance with the light element 208 of the optical sensor assembly 204 (by way of reflected light generated by the light element 208 and incident on the optical sensor 216).

In another example, where translucent cards are detected in a translucent card stack 300 as shown in FIG. 3 the controller 212 continues with the assessment of the light line 306 by way of comparison of the light line with a light line comparator 226 as shown in FIG. 2A. For instance, one or more card detection thresholds are provided with the light line comparator 226 and the light line 306 is compared with the specified threshold to accordingly count the number of cards in the translucent card stack 300. Optionally, the card detection threshold is in one example identical for translucent cards as well as solid (opaque) cards. In another example, the card detection threshold includes two or more card detection thresholds with at least one of the card detection thresholds corresponding to an opaque card detection threshold and another of the card detection thresholds corresponding to a translucent card detection threshold. In still another example, the translucent card detection threshold includes a plurality of thresholds including a translucent threshold, a transparent threshold and a semi-transparent threshold.

Figure 4A:
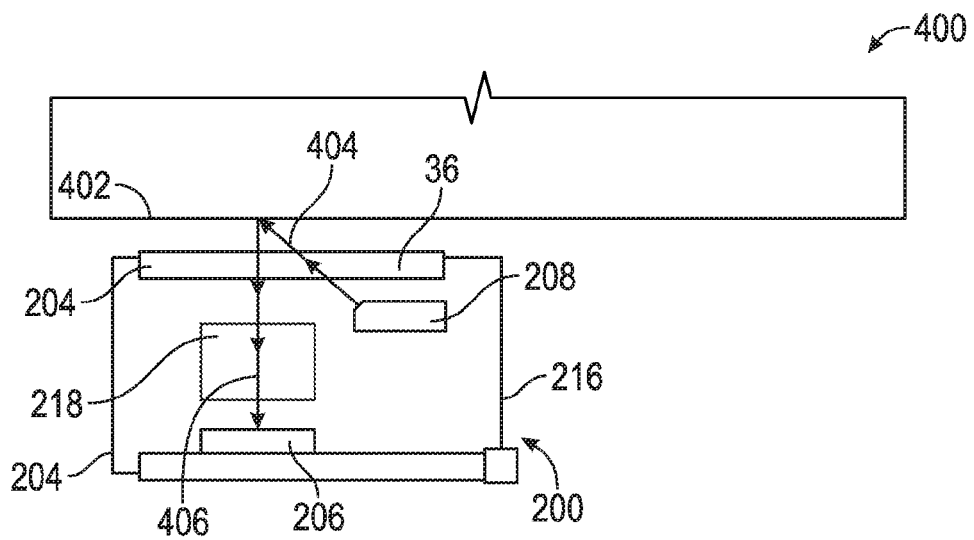
FIG. 4A is a schematic plan view of the sensor system of FIG. 2A in operation with an optical sensor assembly and an opaque card stack.

FIG. 4A shows another schematic example of the sensor assembly 200 including, for instance, the optical sensor 206 and the light element 208. The remote light element 210 is, in one example, absent from the sensory system 200 shown in FIG. 4A. In another example, the remote light element 210 is included with the sensor system 200. An opaque card stack 400 is provided adjacent to the sensor system 200. As shown, the light element 208 of the optical sensor assembly 204 shines reflected light 404 toward the opaque card stack 400. The reflected light 404 reflects off of the opaque card stack 400 and is incident on the optical sensor 206 as a light line 406.

Referring again to FIG. 4A, the light line 406 generated by the reflected light 404 is sensed by the optical sensor 206. In one example, a controller such as the controller 212 shown in FIG. 2A is in communication with the sensor system 200 including, for instance, the optical sensor 206 and the light element 208. The controller 212, in one example, includes a light line comparator 228 as shown in FIG. 2A. The comparator 228 compares the light line 406 with at least one card detection threshold configured to differentiate between light and dark zones of the light line 406 and the controller 212 counts the number of cards in the opaque card stack 400 according to the identified dark and light zones.

Because the card stack 400 is opaque the reflected light 404 from the light element 208 is readily reflected toward optical sensor 206. In contrast and as will be described herein (see FIG. 4B), light generated by the light element 208 and transmitted into a transparent card stack (300) is scattered by the translucent card stack and accordingly incident on the optical sensor 206 as light scattering noise. The light line comparator 228 and the controller 212 have difficulty assessing the light and dark graduations between the interfaces of the translucent cards because of the light scattering noise and in some examples the cards in the translucent card stack 300 are inaccurately counted.

Figure 4B:
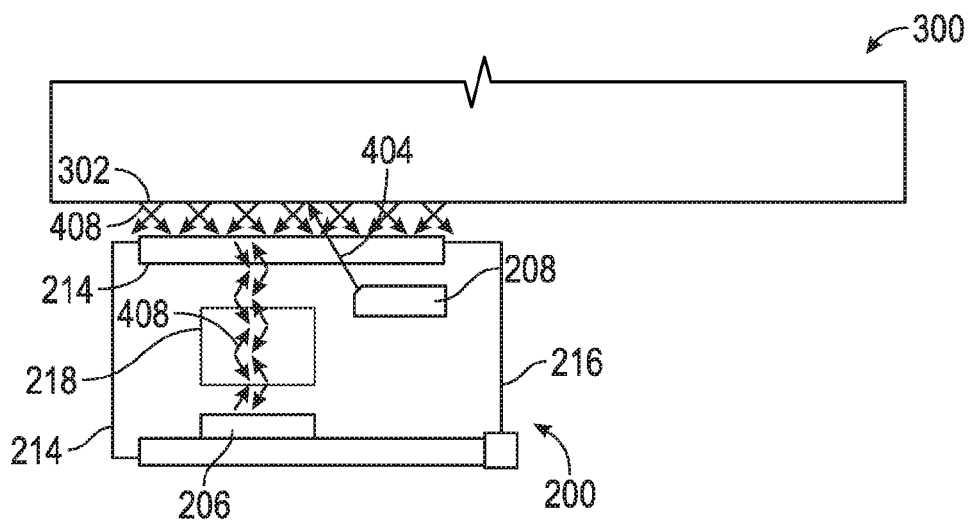
FIG. 4B is a schematic plan view of the sensor system of FIG. 2A in operation with the optical sensor assembly and a translucent card stack.

One example of an arrangement that in some examples generates light scattering noise is shown in FIG. 4B. As shown in FIG. 4B, the sensor system 200 is, in one example, without the remote light element 210 previously shown in FIG. 2A. In another example, the remote light element 210 is included with the sensor system 200 shown in FIG. 4B but in this embodiment is not shown. As shown in FIG. 4B, the light element 208 shines reflected light 404 toward the translucent card stack 300. The light 404 is reflected at least partially off of the card edges 302 as light scattering noise 408 (see the multi-directional arrows representing the scattered light). As shown in FIG. 4B, the light scattering noise 408 travels through the sensor window 214 and is incident on the optical sensor 206. The controller 212 including the light line comparator 228 has difficulty interpreting the light scattering noise 408 (e.g., has difficulty ascertaining a consistent graduation between dark and light zones) and inaccurately counts the translucent card stack 300. That is to say, in one example, the clean differentiation between light and dark zones with an opaque (as opposed to translucent) card stack is concealed by the light scattering noise 408. The sensor system 200 thereby experiences difficulty in accurately counting the cards in the translucent card stack 300.

In contrast, referring again to FIG. 3, the sensor system 200 including the remote light element 210 relies on the translucency of the translucent card stack 300 to broadcast the directed light 304 through the translucent card stack 300 and toward the sensor window 214 and the optical sensor 216. That is to say reflected light is not generated by the remote light element 210 and reflected off the card edges 302 for detection by the optical sensor 206. Accordingly, light scattering noise 408 as shown in FIG. 4B is absent in the operational embodiment shown in FIG. 3. Instead, the directed light 304 is readily broadcast out of the translucent card stack 300 at least at a location remote relative to the remote light element 210 (e.g., at the optical sensor 206 spaced from the remote light element 210). The light line 306 is received by the optical sensor 206 and provides a clean light line (e.g., with minimal noise) configured for ready interpretation by the controller 212 including, for instance, the light line comparator 228. Additionally, with the arrangement shown in FIG. 3, the confidence module 230 including, for instance, a statistical algorithm configured to compare results between multiple light lines 306 (e.g., with the optical sensor 216 operated at a variety of locations, for instance, through movement of the lateral actuator 220) is able to provide an enhanced reliable assessment of the number of cards of the translucent card stack 300 because of the cleaner signal provided by the light line 306 when interpreted multiple times (and locations) by way of the directed light 304 transmitted through the translucent card stack 300.

Referring to FIGS. 5A, B, a card storage and dispensing system 500 is illustrated. The system 500 includes a plurality of modular hoppers 502 arranged into at least one horizontal row 504. In the example illustrated in FIGS. 5A, B, there are three of the modular hoppers 502 in a horizontal row, for instance in a hopper magazine 506 including corresponding hopper bays 508, sized and shaped to receive the hoppers therein. Optionally, access doors for loading the hoppers 502 are provided in the hopper bays 508, for instance at sides of the hopper bays opposed to the card handling mechanism (described herein). In another example, the row 504 includes two or more than three of the hoppers 502.

Further and referring to FIG. 6, hoppers 502 are arranged in at least a column 510. Optionally, the hoppers 502 in the column 510 include a plurality of hoppers 502 arranged in stacked horizontal rows, like row 504 shown in FIGS. 5A, B. Hoppers 502 in one or more stacked rows optionally include the same number of modular hoppers in the other rows 504. In another example, each of the stacked hoppers 502 is horizontally and vertically aligned with the adjacent hoppers. Accordingly, in the example illustrated in FIGS. 5A, B and 6, there are two horizontal rows and three vertical columns, with each horizontal row including three hoppers 502 and each vertical column including two of hoppers 502. The number of rows (e.g., rows 504) and columns (e.g., columns 510) vary in some examples, and the number of modular hoppers 502 in the rows and columns need not be the same. Optionally, the hopper magazine 502 includes third, fourth, and so on horizontal rows disposed vertically above or below the rows 504 with each additional horizontal row 504 including one or more of the hoppers 502.

The hoppers 502 (and the card blanks stored therein) are accessed by a movable card handling mechanism 512 (e.g., one or more of a withdrawal mechanism, elevator or the like). The card handling mechanism 512 is pivotable about a pivot axis (PA) as shown with the double arrows. In the illustrated example the pivot axis is vertical (extends into and out of the page). The card handling mechanism 512 is also movable along the pivot axis PA (e.g., vertically along the PA) as shown in FIG. 6. In another example, the card handling mechanism 512 provides one or more of vertical or horizontal movement (including lateral movement such as rotation, translation or the like).

The card handling mechanism 512 includes a withdrawal mechanism 514 that is supported on an elevator 516, for instance including rods 518. The withdrawal mechanism 514 is optionally moved along the length of the rods 516 as described herein. The rods 518 are fixed on a mechanism housing 520 that is pivotally mounted to pivot about the pivot axis PA. As best seen in FIGS. 5A, B, a drive motor 522 is mounted on the mechanism housing 520, with the motor 522 in driving engagement with the withdrawal mechanism 514 to move the mechanism 514 along the pivot axis PA, for instance into interface positions with stacked hoppers 502.

Still referring to FIGS. 5A, B and 6, each modular hopper 502 has an access end 524 and a closed end 526 opposed to the access end. The access end 524 of each hopper 502 is configured to permit the selection and withdrawal (or loading if reversed) of a card of a card stack from the hopper 502 through the access end 524. The closed end 526 is configured to prevent a card from exiting or entering the respective hopper 502 through the closed end 526. As illustrated in FIGS. 5A, B and 6, each of the access ends 524 face toward the card handling mechanism 512 (e.g., toward the pivot axis PA). The card handling mechanism 512 is thereby able to access each of the access ends 524 of each of the respective modular hoppers 502.

In addition, each hopper 502 has a longitudinal axis (LA) indicated by dashed lines in FIG. 5A. In each horizontal row 504, the hoppers 502 are oriented with the longitudinal axes LA at an angle α relative to each other so that the axes LA intersect at the PA (e.g., on the side of the hoppers 502 corresponding to the access ends 524). The angles α between the longitudinal axes (LA) of the hoppers 502 in each horizontal row 504 are optionally the same. In other embodiments, the angles α differ from one another, for instance within one or more of a horizontal row or between the vertical levels (e.g., the columns 510). In the example shown in FIGS. 5A, B and 6, the pivot axis (PA) of the card handling mechanism 512 is perpendicular to the longitudinal axes (LA) of the hoppers 502.

The card storage and dispensing system 500, including the modular hoppers 502 and the card handling mechanism 512 are optionally used by themselves to handle and process cards. Alternatively, as shown in FIG. 1, the card storage and dispensing system 500 is a component of a card processing system 100 (as described herein) and accordingly used with the various components of the system 100. card storage and dispensing system 500 is positioned adjacent to or on the card processing system 100 to select, withdraw and feed cards into the other components of the card processing system 100 (e.g., for processing). In another example, the card storage and dispensing system 500 is configured to received cards (e.g., after processing) from the remainder of the card processing system 100 for storage. The card processing system 100, as previously described herein, includes any system suitable for processing cards, including personalizing cards, generation of replacement cards or the like. In one embodiment, the card processing system 100 includes at least a housing with a card input and a card output, and a print mechanism within the housing that performs a printing operation on a card (e.g., a card blank).

In another example, the card processing system 100 including the card storage and dispensing system 500 is configured for relatively small scale, individual card personalization and processing where typically a single card (e.g., card blank, document or the like) is input into the components of the processing system 100 from the storage and dispensing system 500. The components of the processing system 100 include, but are not limited to, one or two personalization/processing components, such as one or more of printing or laminating. These card processing systems 100 are in some examples termed desktop processing machines because the systems 100 have a relatively small footprint that allows the systems 100 to reside on a desktop. Examples of card processing systems 100 are known, such as the SD or CD family of desktop card printers available from Entrust Datacard Corporation of Shakopee, Minn. Other examples of card processing systems 100 are disclosed in U.S. Pat. Nos. 7,434,728 and 7,398,972, each of which is incorporated herein by reference in their entirety.

In other examples, the card processing system 100 is configured for large volume batch production of personalized cards. The system 100 includes multiple processing stations or modules to process multiple cards at the same time (e.g., simultaneously, staggered or the like) to reduce the overall per card processing time. Examples of such systems include the MX and MPR family of central issuance processing systems available from Entrust Datacard Corporation of Shakopee, Minn., Other examples of central issuance processing systems are disclosed in U.S. Pat. Nos. 4,825,054, 5,266,781, 6,783,067, and 6,902,107, all of which are incorporated herein by reference in their entirety. As with desktop document processing machines, batch processing machines also include one or more of printing or laminating components.

Returning to FIGS. 5A, B and 6, when the card storage and dispensing system 500 is used as a standalone system, the card handling mechanism 512 optionally includes a controller, such as a microprocessor, disposed thereon or otherwise associated with the mechanism 512 that controls operation of the movable card handling mechanism 512. When the card storage and dispensing system 500 is used with the card processing system 100, operation of the card storage and dispensing system 500 is optionally controlled with a controller of the system 100 or a controller of the card storage and dispensing system 500 in communication with the system 100 controller. Examples of card storage and dispensing systems are known and disclosed in U.S. Patent Application 62/347,709 of Entrust Datacard Corporation of Shakopee, Minn. which is incorporated by reference herein in its entirety.

Figure 7:
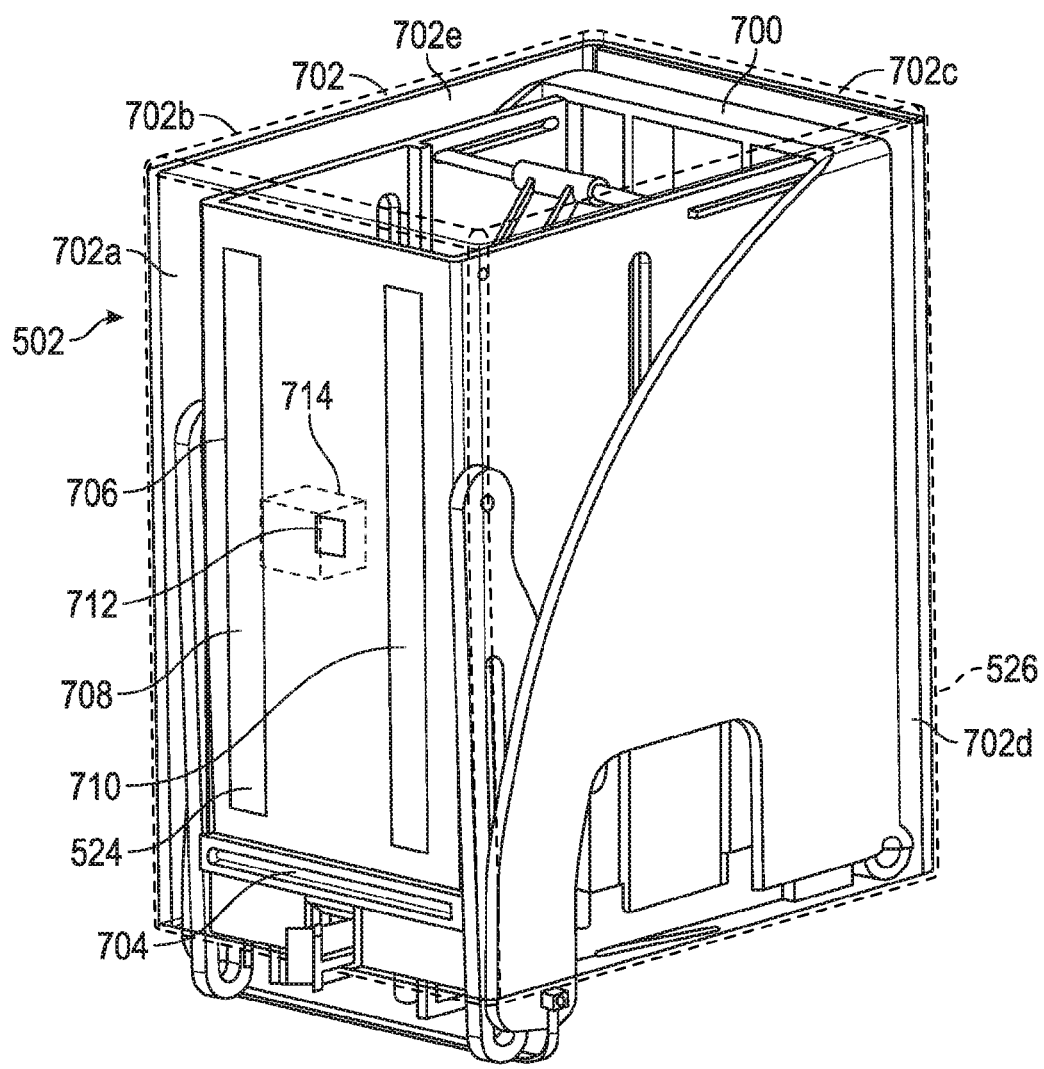
FIG. 7 is a perspective view of one example of a hopper.
Figure 8:
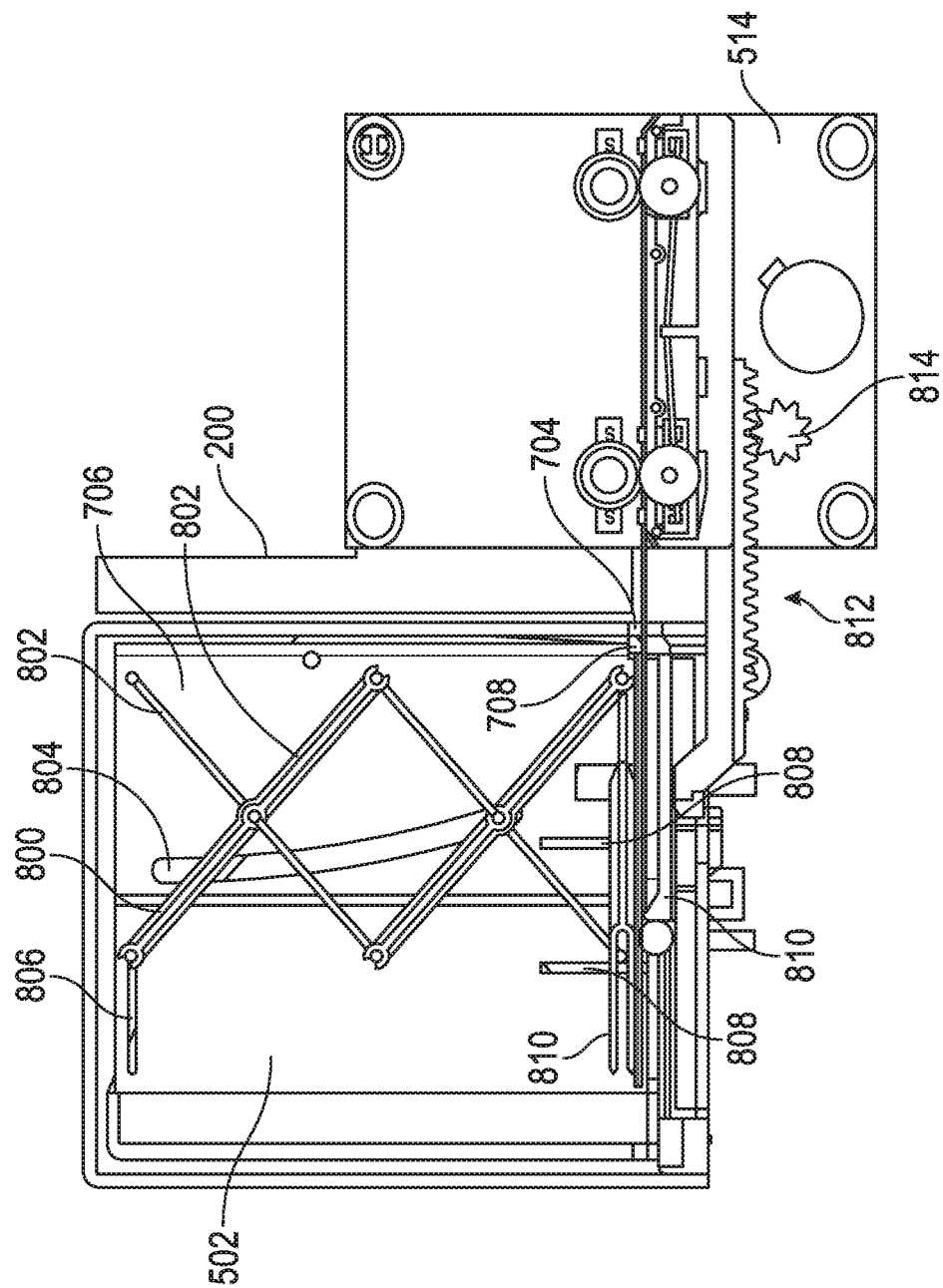
FIG. 8 is a side view of the hopper of FIG. 7 loaded in the card storage and dispensing system.

Details of the hoppers 502 are described herein and shown in FIGS. 7 and 8. The hoppers 502 are configured to store a plurality of cards for eventual processing (in which case the modular hoppers 502 can also be referred to as card storage or card feed hoppers). Optionally, the hoppers 502 are configured to store a plurality of cards after processing (in which case the modular hoppers 502 are also referred to as card storage or card output hoppers). Accordingly one or more, or all, of the modular hoppers 502 in the card storage and dispensing system 500 are optionally card feed hoppers. Further, one or more, of the modular hoppers 502 in the card storage and dispensing system 500 are optionally card output hoppers. One or more, or all, of the modular hoppers 502 in the card storage and dispensing system 500 are configured (in another example) to process cards that are input into and from the modular hoppers 502. In one embodiment, a card feed hopper 502 that is empty after having discharged all of its cards (or after being installed empty) is utilized as a card output hopper 502 that stores processed cards.

To help explain the inventive concepts, the modular hoppers 502 will each be described as card feed hoppers in one non-limiting example. In one example, the modular hoppers 502 are substantially identical in construction to one another. However, the construction of some of the modular card mechanisms may vary depending upon their intended functions. For instance, one or more of the hoppers 502 is in one example designated as a translucent card blank hopper 502. The translucent card blank hopper 502 optionally includes a sensor system 200 of the type described herein including an optical sensor assembly (e.g., sensor and light element) and a remote light element, with the sensor system 200 configured to count translucent cards. The remainder of the hoppers 502 optionally are without the sensor system, and optionally the card handling mechanism 512 includes another sensor system (e.g., an optical sensor assembly) configured to count cards, such as non-translucent card blanks, in each of the other hoppers 502.

Referring to FIG. 7, when configured as card feed hoppers, each of the hoppers 502 includes a housing 700 configured to contain a plurality of cards in a stack (e.g., a card stack) therein. The housing 700 includes security features to prevent unauthorized access to cards within the housing 700 prior to use, for example during transportation of the housing 700.

The housing 700 defines the access end 524 and the closed end 526. As best seen in FIG. 4, the housing 700 is in one example rectangular in construction and includes an outer shell 702 with front and back walls 702a, 702b, side walls 702c, 702d, and a top wall 702e. The outer shell 702 is optionally open at its bottom. A slot 704 is formed in the front wall 702a of the outer shell 702 that allows withdrawal of cards (e.g., one by one) from the housing 700.

The housing 700 further includes an inner shell 706 within the outer shell 702. The inner shell 706 receives the card stack with the faces of the cards laid flat over each other. One or more of the inner or outer shells 706, 702 is removable to facilitate the loading of a card stack therein. The inner shell 706 includes a bottom, a front wall that faces the front wall 702a, a back wall that faces the hack wall 702b, a side wall that faces the side wall 702c, and a side wall that faces the side wall 702d. The inner shell 706 is optionally open at its top and closed by the top wall 702e of the outer shell 702. The front wall of the inner shell 706 also includes a slot 708 (shown in FIG. 8) aligned with the slot 704 in the front wall 702a to allow withdrawal of cards.

Referring to FIG. 8, within the inner shell 706 is a card biasing mechanism 800 that is configured to engage the top of the card stack and bias the cards in the stack toward the bottom of the housing 700. The card biasing mechanism 800 includes a configuration suitable for applying a biasing force to the card stack. In the illustrated example, the card biasing mechanism 800 includes a plurality of links 802 connected together in an accordion-like fashion with portions of the links received within guide slots 804, 806, 808 in the opposing side walls of the inner shell 706, and a bottom plate 810 connected to the base of the links 802 and engageable with the top of the card stack. In operation, the plate 810 is movable a distance limited by the slots 808 when cards are arranged in a stack. A biasing element such as a compression spring, torsion spring, elastomeric element or the like is coupled with one or more of the bottom plate 810 or the links 802 to bias the bottom plate 810 toward the card stack and maintains the card stack in an orderly stacked configuration (e.g., without appreciable gaps or the like).

The hopper 502 optionally includes a card pick mechanism 810 actuated externally by the card handling mechanism 512 including the withdrawal mechanism 514. As shown in FIG. 8, the withdrawal mechanism 514 includes a picking mechanism 812. In one example, the picking mechanism 812 includes a rack having engaged with a drive pinion 814 that is driven in forward and reverse directions (toward and away from the hopper 502). As the picking mechanism 812 moves toward the hopper 502 the front end of the mechanism 812 engages with the card pick mechanism 810. In one example, reverse movement of the picking mechanism 812 cooperates with the card pick mechanism 810 to discharge a card from the hopper 502. In another example, a reversing transmission is included in the hopper 502 and movement of the card picking mechanism 812 into the hopper 502 correspondingly moves the picking card pick mechanism 810 in a reverse direction (out of the hopper 502) to dispense a card. After a card has been discharged, the picking mechanism 812 is then moved in the opposite direction (e.g., by the pinion 122) to allow the card pick mechanism 810 to return to a home position and initiate a new card pick cycle.

Referring again to FIG. 7, in an example, the hopper 502 includes one or more orifices 708, 710 configured cooperate with the sensor system 200. As shown in FIG. 7, the observation orifice 708 and the remote light orifice 710 are provided to either side of a hopper memory 712. The observation orifice 708 and the remote light orifice 710 extend along the height of the hopper 502 and accordingly reveal the edges of the cards in the card stack held within the hopper 502. In one example, the hopper 502 includes the observation orifice 708 (without the remote light orifice).

And in another example, the hopper includes both of the observation and remote light orifices 708, 710.

The observation orifice 708 is aligned with the optical sensor assembly 204, for instance shown in FIGS. 2A, B. The optical sensor assembly 204 (and the sensor system 200) are in one example coupled with one or more of the hopper bay 508 configured to receive the hopper 502 or with the hopper 502 itself. In the example with the sensor system 200 coupled with the hopper bay 508, installation of the hopper 502 into the hopper bay 508 aligns the observation orifice 708 with the optical sensor assembly 204 of the hopper bay 508. The optical sensor assembly 204 shines the reflected light 404 into the observation orifice 708 and it is reflected off of the card stack and back through the orifice 708 and incidents as the light line 406 (see FIG. 4A) on the optical sensor 206. In another example, the observation orifice 708 is sufficiently wide for movement of the optical sensor assembly (e.g. with the lateral actuator 220) to permit shining of the reflected light 404 through the orifice and reception at the optical sensor 206 at multiple positions (to increase the confidence of the count of the card stack). In yet another example, the observation orifice 708 is wider than the remote light orifice 710 to permit observation and illumination of the card stack at multiple positions while the remote light element 710 is static and thereby includes a narrower orifice 710. As described above, in still another example, the sensor system 200 is coupled with the hopper 502, and the optical sensor 206 and the light element are aligned with the observation orifice 708 as part of the installation of the system 200 with the hopper 502.

The remote light orifice 710 is spaced from the observation orifice 708. The intervening portions of the hopper 502 between the orifices and one or more of the hopper bay 508 (with the sensor system coupled to the bay) or the withdrawal mechanism 514 cooperate to interrupt light from the remote light element 210 (such as reflected light) from reaching the optical sensor assembly 204. The remote light orifice 710 reveals the card stack to the remote light element 210 and the element 210 illuminates the card stack through the orifice 710. As previously described herein, if the card stack is translucent (e.g., translucent, transparent, semi-transparent or the like) the directed light 304 from the remote light element 210 passes into the translucent card stack 300 and is at least partially delivered to the optical sensor assembly 204 including the optical sensor 206 (e.g., through the observation orifice 708). In still another example, the sensor system 200 including the remote light element 210 is coupled with the hopper 502, and the remote light element is aligned with the remote light orifice as part of the installation of the system 200 with the hopper 502.

In the example above, the sensor system 200 is installed in one or more of the hopper bays 508 of a system, such as the card storage and dispensing system 500 (see FIGS. 1A, B). One example, of the sensor system 200 coupled with a hopper bay 508 is shown in FIGS. 5A, B. The sensor system 200 in the configuration shown in FIGS. 2A, B, 3, 4A and B is provided in one or more walls of the hopper bays 508, for instance the wall adjacent to the front wall 702a. Upon installation of the hopper 502 in the respective hopper bay 508 the sensor system 202 and the card stack within the hopper 502 are positioned adjacent to each other and ready for counting with the sensor system.

In another example, the sensor system 200 is included with the card handling mechanism 512, for instance the withdrawal mechanism 514. As shown in FIG. 8 the withdrawal mechanism 514 interfaces with the hopper 502 to select and withdraw one or more cards from the hopper. The close positioning of the withdrawal mechanism 514 similarly positions the sensor system 200 in close proximity to the hopper 502. In one example, the positioning of the withdrawal mechanism 514 in the orientation shown in FIG. 8 aligns the components of the sensor system 200 (e.g., one or more of the optical sensor assembly 204, its optical sensor 206 and light element 208 and the remote light element 210) with the respective orifice or orifices 708, 710.

In still another example, the card storage and dispensing system 500 includes sensor systems 200 in a plurality of the hopper bays 508 (e.g., all of the hopper bays or some subset of the bays including a single bay). Optionally, the sensor system 200 is included with the withdrawal mechanism 514 and the withdrawal mechanism 514 is moved between interface positions with each of the hoppers 502 to conduct one or more of withdrawal of cards or counting of the card stack. Three examples of interface positions are shown in FIGS. 5A, B and 6 including horizontal (rotational) and vertical interface positions. Accordingly, the hoppers 502 and the hopper bays 508 are without localized sensor systems 200 and instead the withdrawal mechanism 514 provides a unitary sensor system 200 usable with each of the hoppers 502 and the associated card stacks.

Optionally, the sensor system 200 is included n the withdrawal mechanism 514 and also included with one or more of the hopper bays 508. For instance, where one of or more of the hopper bays 508 is designated as a translucent card hopper bay 508 a first sensor system 200 including the remote light element 210 is installed in the hopper hay, for instance in the manner shown in FIG. 5B. The sensor system 200 at the hopper bay 508 is used to identify translucent cards and count the translucent cards. The withdrawal mechanism 514 in this example includes the sensor system 200 having the optical sensor assembly 204 configured to count opaque cards (e.g., without the remote light element 210) in each of the other hoppers 502 of the other hopper bays 508 (having opaque cards). In still another example, the hopper bay 508 designated for translucent cards includes the remote light element 210 while the remainder of the hopper hays 508 are without components of the sensor system 200. The withdrawal mechanism 514 includes the sensor system 200 having the optical sensor assembly 204. The withdrawal mechanism 514 interfaces with each of the hoppers 502 and hopper bays 508 to count the cards in the respective hoppers. With the withdrawal mechanism 514 interfaced with the hopper bay 508 including the remote light element 210 the optical sensor assembly 204 is configured to identify translucent cards therein and count the cards.

Referring again to FIG. 7, as previously described herein the hopper 502 (including one or more or all of the hoppers 502 used with the system 500) includes a hopper memory 712. The hopper memory 712 includes, but is not limited to, one or more of contact based electronic chips, RFID chips or the like. The hopper memory 712 includes information such as one or more of the initial count of cards in a card stack within the hopper 502, updated card stack counts (e.g., taken during operation of the systems 100, 500 including withdrawal or replacement of cards) and identification information for the cards (e.g., identification number or label of the card stack, customer number, card type in the card stack, or the like). The hopper memory 712 is optionally read at installation of the hopper 502 in the hopper bay 508. For instance, as shown in FIG. 7 a reader 714 (e.g., an RFID, contact reader or the like) is provided with one or more of the hopper bay 508 or the withdrawal mechanism 514 and is configured to read (and optionally write) information to the hopper memory 712.

In one example, the initial count of the card stack is read from the hopper memory 712 and compared with a card count conducted by the sensor system 200. If the counts are not the same an alert is provided to an operator (e.g., indicating a security issues, such as one or more of the cards has been improperly removed). In another example, the initial count of the card stack is decremented as one or more cards are withdrawn from the hopper 502 (e.g., according to the withdrawal operation). The decrement is withdrawn from the initial count of the card stack and the hopper memory 712 updated with an updated card count. An alert is optionally provided, for instance by the controller 212 or one or more of the systems 100, 500, to the operator indicating the number of cards in a hopper 502 is low based on the ongoing decrementing. For instance, with a hopper including 100 card blanks when a low threshold of 10 cards is reached according to the decrementing described herein the operator or other automatic system receives an alert that reloading of the hopper 502 or transitioning to another hopper 502 is needed to continue production without a delay.

Optionally, the card stack is counted with the sensor system 200 at one or more of regular intervals or qualifying events, and the updated count is written to the hopper memory 712. For instance, in one example, the card stack is counted by the sensor system 200 at installation of the hopper 502 to the system 500 (as described herein). In another example, the sensor system 200 counts the card stack after one or more card withdrawals for processing; when the power is cycled for either of the systems 100, 500; prior to accessing or removal of the hopper 502 from the system 500 (e.g., when the hopper 502 is unlocked); opening of a security door or operation of a release feature or the like (generally considered decoupling operations). The sensor system 200 automatically counts the cards of the card stack at one or more of these events (e.g., with prompting by a controller, such as the controller 212) and writes the updated card count to the hopper memory 712. The updated card count is then read, for instance at reinstallation of the hopper 502 from a security locker, and compared with an instant card count of the card stack made by the sensor system 200 when the hopper 502 is reinstalled. If the updated (stored) card count does not match the instant card count taken by the sensor system 200 an alert is provided to the operator (or other automatic system) that indicates the difference in counts.

Figure 9:
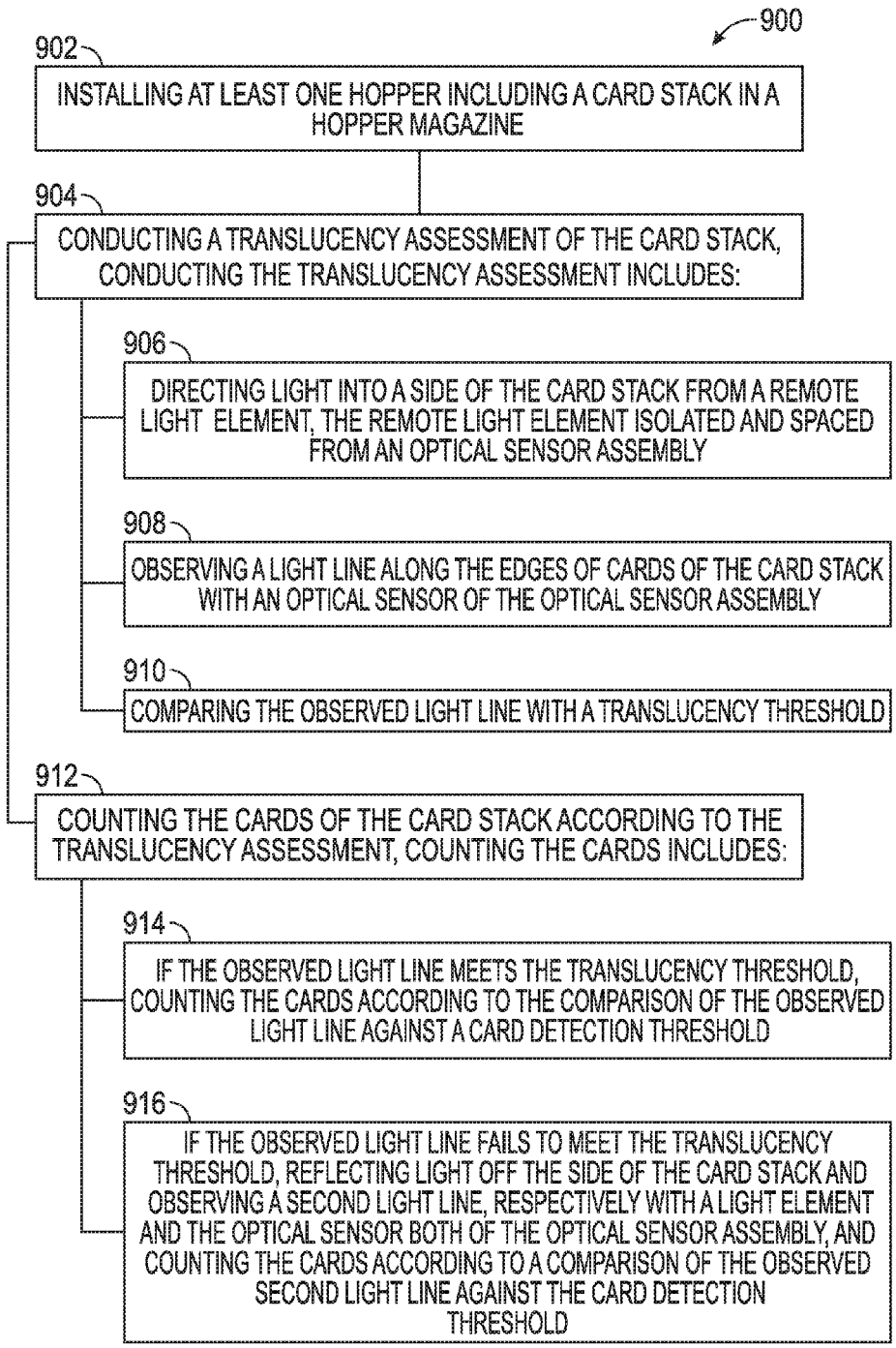
FIG. 9 is a block diagram showing one example of a method for counting cards in a card stack.

FIG. 9 shows one example of a method 900 for counting cards in a card stack. In describing the method 900, reference is made to one or more components, features, functions, steps or the like described herein. Where convenient reference is made to the components, features, functions, steps and the like with reference numerals. Reference numerals provided are exemplary and are not exclusive. For instance, the features, components, functions, steps or the like described in the method 900 include, but are not limited to, the corresponding numbered elements, other corresponding features described herein (both numbered and unnumbered) as well as their equivalents.

At 902, at least one hopper 502 is installed, for instance in a card processing system 100, hopper bay 508 of a hopper magazine or the like. The card hopper 502 includes a card stack. The card stack includes a plurality of cards stacked therein. The sensor system 200 described herein counts the cards in the card stack according to one or more assessments.

At 904 the method 900 includes conducting a translucency assessment of the card stack. Conducting the translucency assessment includes one or more of directing light into a side of the card stack from a remote light element 210 at 906. As described herein the remote light element 210 is, in one example, isolated and spaced from an optical sensor assembly 204 including an optical sensor 206 and a light element 208. At 908, a light line is observed along the edges of cards of the card stack with the optical sensor 206 of the optical sensor assembly 204. At 910, the observed light line is compared with a translucency threshold.

The cards of the card stack are counted (at 912) according to the translucency assessment. In one example, counting the cards includes at 914 counting the cards according to the comparison of the observed light line against a card detection threshold if the observed light line meets the translucency threshold. And at 916, if the observed light line fails to meet the translucency threshold counting the cards includes reflecting light off the side of the card stack and observing a second light line, respectively with a light element 208 and the optical sensor 206 both of the optical sensor assembly 204. The cards are counted according to a comparison of the observed second light line against the card detection threshold.

Several options for the method 900 follow. In one example, the method 900 includes moving the optical sensor assembly 204 along the side of the card stack while one or more of light is directed into or light is reflected off the side of the card stack. In another example, one or more of the light line or the second light line each include a plurality of light lines, and one or more of observing the light line or observing the second light line includes observing the plurality of light lines, and comparing the observed light line or comparing the second light line includes comparing the plurality of light lines with the translucency or card detection threshold, respectively.

In another example, directing light into the side of the card stack from the remote light element 210 includes directing light through the side of a translucent card stack including one or more of transparent, translucent, semi-transparent, clouded cards or the like.

The method 900 further includes in another example, decrementing the counted number of cards for each card removed from the at least one hopper 502, for instance with the card handling mechanism 512, and writing an updated counted number of cards to a memory 712 based on the decrementing. In an example, the memory 712 is coupled with the at least one hopper 502, and writing the updated counted number of cards to the memory 712 is triggered with a decoupling operation of the at least one hopper 502 from the hopper magazine 506. In one example, decrementing the counted number of cards includes decrementing based on removal of a card from the card stack (e.g., operation of the card handling mechanism 512, detected passage of a card into the processing system 100 or the like triggers the decrementing. In another example, decrementing the counted number of cards includes decrementing based on repeating counting of the cards of the card stack with one or more of observing the light line or observing the second light line.

In still another example, the method 900 further includes reinstalling the at least one hopper 502 in the hopper magazine 506. The method 900 repeats counting of the cards of the card stack at reinstallation and compares the instant counting with the updated counted number of cards written to the memory 712. Optionally, the method 900 (sensor system 200) delivers an alert if the counted number of cards at reinstallation does not match the updated counted number of cards written to the memory 712.

The method further includes contacting the optical sensor assembly 204 with the card stack. Contacting includes one or more of physically engaging the card stack with the optical sensor assembly and positioning of one or more of the card stack or the optical sensor assembly 204 immediately adjacent to the other (e.g., within around plus or minus 1 mm). In another example, contacting the optical sensor assembly 204 with the card stack includes moving a card handling mechanism 512 including the optical sensor assembly 204 and the remote light element 210 into an interface position with the at least one hopper 502.

Optionally, the card stack includes first and second card stacks of respective first and second hoppers 502. The method 900 includes moving the card handling mechanism 512 between first and second interface positions with the first and second hoppers 502, respectively. And contacting the optical sensor assembly with the card stack includes contacting the optical sensor assembly 204 with at least one of the first card stack or the second cart stack at the first and second interface positions, respectively.

In another example, contacting the optical sensor assembly 204 with the card stack includes installing the at least one hopper 502 including the card stack in the hopper magazine 506, the hopper magazine 506 includes the optical sensor assembly 204 and the remote light element 210.

Various Notes & Examples

Example 1 can include subject matter, such as can include a sensor system for counting cards comprising: an optical sensor assembly configured to detect edges of cards in a card stack: an optical sensor, and a light element coupled with the optical sensor, the light element configured to reflect light from a card stack toward the optical sensor; a remote light element spaced from the optical sensor assembly, the remote light element configured to direct light toward the card stack; and wherein one or more of the optical sensor or the remote light element are configured to isolate the optical sensor from uninterrupted light from the remote light element.

Example 2 can include, or can optionally be combined with the subject matter of Example 1, to optionally include wherein each of the optical sensor, the light element and the remote light element are oriented orthogonally to faces of the cards in the card stack.

Example 3 can include, or can optionally be combined with the subject matter of one or any combination of Examples 1 or 2 to optionally include wherein the optical sensor is a contact optical sensor configured for contact or placement immediately adjacent to the card stack to detect edges of cards of the card stack.

Example 4 can include, or can optionally be combined with the subject matter of one or any combination of Examples 1-3 to optionally include a controller in communication with each of the optical sensor assembly and the remote light element.

Example 5 can include, or can optionally be combined with the subject matter of one or any combination of Examples 1-4 to optionally include wherein the controller includes: an initialization module configured to operate the remote light element, and a translucency comparator configured to compare a light line along the edges of the cards detected by the optical sensor with a translucency threshold.

Example 6 can include, or can optionally be combined with the subject matter of Examples 1-5 to optionally include wherein the controller includes: a light line comparator configured to compare a light line along the edges of the cards detected by the optical sensor with a card detection threshold, and a counting module configured to count the cards of the card stack according to the comparison of the light line against the card detection threshold.

Example 7 can include, or can optionally be combined with the subject matter of Examples 1-6 to optionally include a memory in communication with the controller, the memory is configured to store the count of the cards of the card stack.

Example 8 can include, or can optionally be combined with the subject matter of Examples 1-7 to optionally include a lateral actuator coupled with the optical sensor assembly, the lateral actuator is configured to move the optical sensor and the light element together along the card stack.

Example 9 can include, or can optionally be combined with the subject matter of Examples 1-8 to optionally include wherein the lateral actuator is configured to move the optical sensor assembly relative to the remote light element.

Example 10 can include, or can optionally be combined with the subject matter of Examples 1-9 to optionally include an elevator, and each of the optical sensor assembly and the remote light element are coupled with the elevator.

Example 11 can include, or can optionally be combined with the subject matter of Examples 1-10 to optionally include a hopper magazine including at least two or more hopper bays; and wherein at least one hopper bay of the two or more hopper bays includes the optical sensor assembly and the remote light element, and another hopper bay of the two or more hopper bays includes another optical sensor assembly and another remote light element.

Example 12 can include, or can optionally be combined with the subject matter of Examples 1-11 to optionally include a card storage and dispensing system comprising: a hopper magazine including two or more hoppers, each of the two or more hoppers configured to store cards in card stacks; a card handling mechanism movable relative to the two or more hoppers, the card handling mechanism includes: a withdrawal mechanism configured to withdraw at least one card from the card stacks in the two or more hoppers, an optical sensor, and a light element adjacent to the optical sensor, the light element is configured to reflect light from the card stacks of the two or more hoppers toward the optical sensor; and an elevator coupled with the card handling mechanism, the elevator is configured to move the card handling mechanism into at least first and second interface positions with the two or more hoppers: in the first interface position the withdrawal mechanism is oriented toward the card stack of a first hopper of the two or more hoppers, and the optical sensor and the light element are directed toward the card stack of the first hopper, and in the second interface position the withdrawal mechanism is oriented toward the card stack of a second hopper of the two or more hoppers, and the optical sensor and the light element are directed toward the card stack of the second hopper.

Example 13 can include, or can optionally be combined with the subject matter of Examples 1-12 to optionally include wherein the card handling mechanism includes a remote light element spaced from the optical sensor, the remote light element configured to direct light toward the card stack, and one or more of the optical sensor or the remote light element are configured to isolate the optical sensor from uninterrupted light from the remote light element.

Example 14 can include, or can optionally be combined with the subject matter of Examples 1-13 to optionally include wherein in the first interface position the remote light element is directed toward the card stack of the first hopper, and in the second interface position the remote light element is directed toward the card stack of the second hopper.

Example 15 can include, or can optionally be combined with the subject matter of Examples 1-14 to optionally include wherein the optical sensor and the light element are oriented orthogonally to faces of the cards in the card stacks at each of the first and second interface positions, respectively.

Example 16 can include, or can optionally be combined with the subject matter of Examples 1-15 to optionally include wherein the optical sensor is a contact optical sensor configured for contact or placement immediately adjacent to the card stacks to detect edges of cards of the card stacks at each of the first and second interface positions, respectively.

Example 17 can include, or can optionally be combined with the subject matter of Examples 1-16 to optionally include wherein the elevator is configured to move the card handling mechanism vertically relative to the two or more hoppers.

Example 18 can include, or can optionally be combined with the subject matter of Examples 1-17 to optionally include wherein the elevator is configured to move the card handling mechanism laterally relative to the two or more hoppers.

Example 19 can include, or can optionally be combined with the subject matter of Examples 1-18 to optionally include a lateral actuator coupled with the card handling mechanism and each of the optical sensor and the light element, the lateral actuator is configured to move the optical sensor and the light element together along the card stacks at each of the first and second interface positions.

Example 20 can include, or can optionally be combined with the subject matter of Examples 1-19 to optionally include wherein the two or more hoppers each including a memory device configured to store a count of cards in the respective hopper, the count of cards based on reflected light from the light element detected by the optical sensor.

Example 21 can include, or can optionally be combined with the subject matter of Examples 1-20 to optionally include a card storage and dispensing system comprising: a hopper magazine including two or more hopper bays, each of the two or more hopper bays configured to receive a hopper including cards in a card stack, and each of the two or more hopper bays includes: a bay frame, an optical sensor coupled with the bay frame, and a light element adjacent to the optical sensor, the light element is configured to reflect light from the card stack of the hopper within the respective hopper bay toward the optical sensor; a card handling mechanism movable relative to the two or more hopper bays, the card handling mechanism includes a withdrawal mechanism configured to withdraw at least one card from the card stacks in the hoppers in the two or more hopper bays; and an elevator coupled with the card handling mechanism, the elevator is configured to move the card handling mechanism into at least first and second interface positions with the hoppers in the two or more hopper bays.

Example 22 can include, or can optionally be combined with the subject matter of Examples 1-21 to optionally include wherein each of the hopper bays of the two or more hopper bays includes a remote light element coupled with the bay frame and spaced from the optical sensor, the remote light element configured to direct light toward the card stack in the hopper in the respective hopper bay, and one or more of the optical sensor or the remote light element are configured to isolate the optical sensor from uninterrupted light from the remote light element.

Example 23 can include, or can optionally be combined with the subject matter of Examples 1-22 to optionally include wherein the hopper includes an observation orifice and edges of the cards in the card stack are revealed through the observation orifice, and with the hopper in an installed configuration within one of the two or more hopper bays at least the optical sensor and the light element are directed toward the edges of the cards through the observation orifice.

Example 24 can include, or can optionally be combined with the subject matter of Examples 1-23 to optionally include wherein the optical sensor and the light element are oriented orthogonally to the faces of the cards in the card stack.

Example 25 can include, or can optionally be combined with the subject matter of Examples 1-24 to optionally include wherein the optical sensor is a contact optical sensor configured for contact or placement immediately adjacent to the card stack to detect edges of cards of the card stack.

Example 26 can include, or can optionally be combined with the subject matter of Examples 1-25 to optionally include wherein the elevator is configured to move the card handling mechanism vertically relative to the two or more hopper bays.

Example 27 can include, or can optionally be combined with the subject matter of Examples 1-26 to optionally include wherein the elevator is configured to move the card handling mechanism laterally relative to the two or more hopper bays.

Example 28 can include, or can optionally be combined with the subject matter of Examples 1-27 to optionally include wherein each of the two or more hopper hays includes a lateral actuator coupled with the bay frame and each of the optical sensor and the light element, the lateral actuator is configured to move the optical sensor and the light element together along the card stack in the hopper in the respective hopper bay.

Example 29 can include, or can optionally be combined with the subject matter of Examples 1-28 to optionally include two or more hoppers configured for reception within the respective two or more hopper bays, wherein the two or more hoppers each include a memory device configured to store a count of cards in the respective hopper, the count of cards based on reflected light from the light element detected by the optical sensor.

Example 30 can include, or can optionally be combined with the subject matter of Examples 1-29 to optionally include a card hopper comprising: a hopper housing configured to contain a plurality of cards in a card stack, the hopper includes at least one card slot configured to pass at least one card of the plurality of cards from the card stack; and a sensor system coupled with the hopper housing, the sensor system is configured to count the card stack, the sensor system includes an optical sensor assembly having: an optical sensor coupled with the hopper housing, and a light element adjacent to the optical sensor, the light element is configured to reflect light from the card stack of the hopper toward the optical sensor.

Example 31 can include, or can optionally be combined with the subject matter of Examples 1-30 to optionally include wherein the sensor system includes a remote light element spaced from the optical sensor assembly, the remote light element is configured to direct light toward the card stack.

Example 32 can include, or can optionally be combined with the subject matter of Examples 1-31 to optionally include wherein one or more of the optical sensor or the remote light element are configured to isolate h optical sensor from uninterrupted light from the remote light element.

Example 33 can include, or can optionally be combined with the subject matter of Examples 1-32 to optionally include wherein the sensor system includes a lateral actuator coupled between the optical sensor assembly and hopper housing, the lateral actuator is configured to move the optical sensor assembly laterally along edges of the plurality of cards of the card stack.

Example 34 can include, or can optionally be combined with the subject matter of Examples 1-33 to optionally include a method for counting cards in a card stack comprising: installing at least one hopper including a card stack in a hopper magazine; conducting a translucency assessment of the card stack, conducting the translucency assessment includes: directing light into a side of the card stack from a remote light element, the remote light element isolated and spaced from an optical sensor assembly, observing a light line along the edges of cards of the card stack with an optical sensor of the optical sensor assembly, and comparing the observed light line with a translucency threshold; and counting the cards of the card stack according to the translucency assessment, counting the cards includes: if the observed light line meets the translucency threshold, counting the cards according to the comparison of the observed light line against a card detection threshold, and if the observed light line fails to meet the translucency threshold, reflecting light off the side of the card stack and observing a second light line, respectively with a light element and the optical sensor both of the optical sensor assembly, and counting the cards according to a comparison of the observed second light line against the card detection threshold.

Example 35 can include, or can optionally be combined with the subject matter of Examples 1-34 to optionally include moving the optical sensor assembly along the side of the card stack while one or more of light is directed into or light is reflected off the side of the card stack.

Example 36 can include, or can optionally be combined with the subject matter of Examples 1-35 to optionally include wherein the light line and the second light line each include a plurality of light lines, one or more of observing the light line or observing the second light line includes observing the plurality of light lines, and comparing the observed light line or comparing the second light line includes comparing the plurality of light lines with the translucency or card detection threshold, respectively.

Example 37 can include, or can optionally be combined with the subject matter of Examples 1-36 to optionally include wherein directing light into the side of the card stack from the remote light element includes directing light through the side of a translucent card stack.

Example 38 can include, or can optionally be combined with the subject matter of Examples 1-37 to optionally include decrementing the counted number of cards for each card removed from the at least one hopper; and writing an updated counted number of cards to a memory based on the decrementing.

Example 39 can include, or can optionally be combined with the subject matter of Examples 1-38 to optionally include wherein the memory is coupled with the at least one hopper, and writing the updated counted number of cards to the memory is triggered with a decoupling operation of the at least one hopper from the hopper magazine.

Example 40 can include, or can optionally be combined with the subject matter of Examples 1-39 to optionally include reinstalling the at least one hopper in the hopper magazine; repeating counting of the cards of the card stack at reinstallation and comparing with the updated counted number of cards written to the memory; and delivering an alert if the counted number of cards at reinstallation does not match the updated counted number of cards written to the memory.

Example 41 can include, or can optionally be combined with the subject matter of Examples 1-40 to optionally include wherein decrementing the counted number of cards includes decrementing based on removal of card from the card stack.

Example 42 can include, or can optionally be combined with the subject matter of Examples 1-41 to optionally include wherein decrementing the counted number of cards includes decrementing based on repeating counting of the cards of the card stack with one or more of observing the light line or observing the second light line.

Example 43 can include, or can optionally be combined with the subject matter of Examples 1-42 to optionally include contacting the optical sensor assembly with the card stack.

Example 44 can include, or can optionally be combined with the subject matter of Examples 1-43 to optionally include wherein contacting the optical sensor assembly with the card stack includes moving a card handling mechanism including the optical sensor assembly and the remote light element into an interface position with the at least one hopper.

Example 45 can include, or can optionally be combined with the subject matter of Examples 1-44 to optionally include wherein the card stack includes first and second card stacks of respective first and second hoppers, comprising: moving the card handling mechanism between first and second interface positions with the first and second hoppers, respectively; and contacting the optical sensor assembly with the card stack includes contacting the optical sensor assembly with at least one of the first card stack or the second cart stack at the first or second interface positions.

Example 46 can include, or can optionally be combined with the subject matter of Examples 1-45 to optionally include wherein contacting the optical sensor assembly with the card stack includes installing the at least one hopper including the card stack in the hopper magazine, the hopper magazine includes the optical sensor assembly and the remote light element.

Example 47 can include, or can optionally be combined with the subject matter of Examples 1-46 to optionally include wherein contacting the optical sensor assembly with the card stack includes positioning the optical sensor immediately adjacent to the card stack.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the disclosure can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more," In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the disclosure should be determined with reference to the appended claims, along with the full scope of equivalents to which such claims are entitled.

The claimed invention is:

1. A sensor system for counting cards comprising:
   an optical sensor assembly configured to detect edges of cards in a card stack, the optical sensor assembly includes:
     an optical sensor, and
     a reflecting light element coupled with the optical sensor, the reflecting light element configured to reflect light from a card stack toward the optical sensor,
   a remote light element spaced from the optical sensor assembly, the remote light element configured to direct light through the card stack and toward the optical sensor; and
   wherein one or more of the optical sensor or the remote light element are configured to isolate the optical sensor from uninterrupted light from the remote light element.

2. The sensor system of claim 1, wherein each of the optical sensor, the light element and the remote light element are oriented orthogonally to faces of the cards in the card stack.

3. The sensor system of claim 1, wherein the optical sensor is a contact optical sensor configured for contact or placement immediately adjacent to the card stack to detect edges of cards of the card stack.

4. The sensor system of claim 1 comprising a controller in communication with each of the optical sensor assembly and the remote light element.

5. The sensor system of claim 4, wherein the controller includes:
   an initialization module configured to operate the remote light element, and
   a translucency comparator configured to compare a light line along the edges of the cards detected by the optical sensor with a translucency threshold.

6. The sensor system of claim 4, wherein the controller includes:
   a light line comparator configured to compare a light line along the edges of the cards detected by the optical sensor with a card detection threshold, and
   a counting module configured to count the cards of the card stack according to the comparison of the light line against the card detection threshold.

7. The sensor system of claim 6 comprising a memory in communication with the controller, the memory is configured to store the count of the cards of the card stack.

8. The sensor system of claim 1 comprising an elevator, and each of the optical sensor assembly and the remote light element are coupled with the elevator.

9. The sensor system of claim 1 comprising a hopper magazine including at least two or more hopper bays; and
   wherein at least one hopper bay of the two or more hopper bays includes the optical sensor assembly and the remote light element, and another hopper bay of the two or more hopper bays includes another optical sensor assembly and another remote light element.

10. A card storage and dispensing system comprising:
    a hopper magazine including two or more hopper bays, each of the two or more hopper bays configured to receive a hopper including cards in a card stack, and each of the two or more hopper bays includes:
      a bay frame,
      an optical sensor coupled with the bay frame, and
      a reflecting light element adjacent to the optical sensor, the reflecting light element is configured to reflect light from the card stack of the hopper within the respective hopper bay toward the optical sensor;

one or more of the hopper bays includes a remote light element coupled with the bay frame and spaced from the optical sensor, the remote light element configured to direct light through the card stack in the hopper in the hopper bay toward the optical sensor, and the optical sensor is isolated from uninterrupted light from the remote light element;

a card handling mechanism movable relative to the two or more hopper bays, the card handling mechanism includes a withdrawal mechanism configured to withdraw at least one card from the card stacks in the hoppers in the two or more hopper bays; and an elevator coupled with the card handling mechanism, the elevator is configured to move the card handling mechanism into at least first and second interface positions with the hoppers in the two or more hopper bays.

11. The card storage and dispensing system of claim 10, wherein the hopper includes an observation orifice and edges of the cards in the card stack are revealed through the observation orifice, and with the hopper in an installed configuration within one of the two or more hopper bays at least the optical sensor and the light element are directed toward the edges of the cards through the observation orifice.

12. The card storage and dispensing system of claim 10, wherein the optical sensor and the light element are oriented orthogonally to the faces of the cards in the card stack.

13. The card storage and dispensing system of claim 10, wherein the optical sensor is a contact optical sensor configured for contact or placement immediately adjacent to the card stack to detect edges of cards of the card stack.

14. The card storage and dispensing system of claim 10, wherein the elevator is configured to move the card handling mechanism vertically relative to the two or more hopper bays.

15. The sensor system of claim 10, wherein the elevator is configured to move the card handling mechanism laterally relative to the two or more hopper bays.

16. The sensor system of claim 10 comprising two or more hoppers configured for reception within the respective two or more hopper bays, wherein the two or more hoppers each include a memory device configured to store a count of cards in the respective hopper, the count of cards based on reflected light from the light element detected by the optical sensor.

17. A card hopper comprising:
a hopper housing configured to contain a plurality of cards in a card stack, the hopper includes at least one card slot configured to pass at least one card of the plurality of cards from the card stack; and
a sensor system coupled with the hopper housing, the sensor system is configured to count the card stack, the sensor system includes an optical sensor assembly having:
an optical sensor coupled with the hopper housing,
a reflecting light element adjacent to the optical sensor, the reflecting light element is configured to reflect light from the card stack of the hopper toward the optical sensor, and
a remote light element spaced from the optical sensor, the remote light element configured to direct light through the card stack and toward the optical sensor.

18. The card hopper of claim 17, wherein one or more of the optical sensor or the remote light element are configured to isolate the optical sensor from uninterrupted light from the remote light element.

19. The card hopper of claim 17, wherein the sensor system includes a lateral actuator coupled between the optical sensor assembly and hopper housing, the lateral actuator is configured to move the optical sensor assembly laterally along edges of the plurality of cards of the card stack.

20. A sensor system for counting cards comprising:
an optical sensor assembly configured to detect edges of cards in a card stack, the optical sensor assembly includes:
an optical sensor, and
a reflecting light element coupled with the optical sensor, the reflecting light element configured to reflect light from a card stack toward the optical sensor;
a remote light element spaced from the optical sensor assembly, the remote light element configured to direct light through the card stack and toward the optical sensor;
wherein one or more of the optical sensor or the remote light element are configured to isolate the optical sensor from uninterrupted light from the remote light element; and
a lateral actuator coupled with the optical sensor assembly, the lateral actuator is configured to move the optical sensor and the light element together along the card stack relative to the remote light element.

21. The sensor system of claim 20, wherein the optical sensor is a contact optical sensor configured for contact or placement immediately adjacent to the card stack to detect edges of cards of the card stack.

22. A card storage and dispensing system comprising:
a hopper magazine including two or more hopper bays, each of the two or more hopper bays configured to receive a hopper including cards in a card stack, and each of the two or more hopper bays includes:
a bay frame,
an optical sensor coupled with the bay frame, and
a light element adjacent to the optical sensor, the light element is configured to reflect light from the card stack of the hopper within the respective hopper bay toward the optical sensor;
a card handling mechanism movable relative to the two or more hopper bays, the card handling mechanism includes a withdrawal mechanism configured to withdraw at least one card from the card stacks in the hoppers in the two or more hopper bays;
each of the two or more hopper bays includes a lateral actuator coupled with the respective bay frame and each of the optical sensor and the light element, the lateral actuator is configured to move the optical sensor and the light element together along the card stack in the hopper in the respective hopper bay; and
an elevator coupled with the card handling mechanism, the elevator is configured to move the card handling mechanism into at least first and second interface positions with the hoppers in the two or more hopper bays.

23. The card storage and dispensing system of claim 22, wherein the elevator is configured to move the card handling mechanism in one or more of a lateral direction or orthogonal direction relative to the lateral direction to the two or more hopper bays.

24. A card hopper comprising:
a hopper housing configured to contain a plurality of cards in a card stack, the hopper includes at least one card slot configured to pass at least one card of the plurality of cards from the card stack;
a sensor system coupled with the hopper housing, the sensor system is configured to count the card stack, the sensor system includes an optical sensor assembly having:
an optical sensor coupled with the hopper housing,
a reflecting light element adjacent to the optical sensor, the reflecting light element is configured to reflect light from the card stack of the hopper toward the optical sensor, and
a remote light element spaced from the optical sensor, the remote light element configured to direct light through the card stack and toward the optical sensor; and
a lateral actuator coupled with the optical sensor and the reflecting light element, the lateral actuator is configured to move the optical sensor and the reflecting light element relative to the remote light element.

25. The card hopper of claim 24, wherein the optical sensor is isolated from uninterrupted light from the remote light element.

\* \* \* \* \*

UNITED STATES PATENT AND TRADEMARK OFFICE
CERTIFICATE OF CORRECTION

PATENT NO. : 10,482,295 B2  
APPLICATION NO. : 15/621812  
DATED : November 19, 2019  
INVENTOR(S) : Sarkinen et al.

Page 1 of 1

It is certified that error appears in the above-identified patent and that said Letters Patent is hereby corrected as shown below:

In the Claims

In Column 28, Line 10, in Claim 1, delete "sensor," and insert --sensor;-- therefor Signed and Sealed this  
Twenty-third Day of June, 2020

Andrei Iancu  
*Director of the United States Patent and Trademark Office*